US 6,337,801 B2

(12) United States Patent
Li et al.

(10) Patent No.: US 6,337,801 B2
(45) Date of Patent: Jan. 8, 2002

(54) THREE-PHASE ZERO-CURRENT-TRANSITION (ZCT) INVERTERS AND RECTIFIERS WITH THREE AUXILIARY SWITCHES

(75) Inventors: Yong Li; Fred C. Lee, both of Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 09/736,428

(22) Filed: Dec. 15, 2000

Related U.S. Application Data
(60) Provisional application No. 60/171,096, filed on Dec. 16, 1999.

(51) Int. Cl.[7] .................................................. H02M 7/72
(52) U.S. Cl. ..................... 363/127; 363/129; 363/132; 363/137
(58) Field of Search ............................... 363/125, 127, 363/129, 132, 137

(56) References Cited

U.S. PATENT DOCUMENTS

| | | | |
|---|---|---|---|
| 5,418,704 A | 5/1995 | Hua et al. | 363/21 |
| 5,486,752 A | 1/1996 | Hua et al. | 323/222 |
| 5,574,636 A | * 11/1996 | Lee et al. | 363/132 |
| 6,172,882 B1 | * 1/2001 | Tanaka et al. | 363/132 |

OTHER PUBLICATIONS

W. McMurray, "SCR Inverter Commuted by an Auxiliary Impulse," IEEE Trans. Communications and Electronics, vol. 8–75, pp. 824–829 Nov./Dec., 1964.

General Electric Company, "SCR Manual (Sixth Edition)," Dec. 1979.

W. McMurray, "Thyristor commutation in dc choppers—a comparative study," IEEE Trans. Ind. Applicat., vol. IA–14, pp. 547–558 Nov./Dev, 1978.

(List continued on next page.)

Primary Examiner—Jeffrey Sterrett
(74) Attorney, Agent, or Firm—Whitham, Curtis & Christofferson, P.C.

(57) ABSTRACT

Zero current transition (ZCT) topologies are presented for three-phase inverters and rectifiers. Such devices are used for example in AC adjustable speed drives for so-called zero-emission vehicles (i.e., electric and hybrid combustion/electric automobiles). Compared to existing three-phase ZCT techniques, the number of auxiliary switches is reduced from six to three, while not altering the necessary device rating. Correspondingly, the number of gate-drivers for the auxiliary switches is also reduced to three. Meanwhile, the merits of the existing three-phase ZCT techniques are still retained, i.e., all the main switches and the auxiliary switches are turned on and turned off under zero-current conditions, and the independent commutation for each main switch is achieved. The desired soft-switching features are achieved. Therefore, this invention will contribute to more cost-effective, reliable, and efficient high-performance three-phase inverters and rectifiers.

10 Claims, 22 Drawing Sheets

OTHER PUBLICATIONS

G. Hua, E. Yang, Y. Jiang, and F.C. Lee, "Novel Zero–Current–Transition PEM Converters," IEEE–PESC, Dec. 1993 pp. 538–544.

M. Bellar, T. Wu, A. Tchamdjou, J. Mahdavi and M. Ehsani, "A review of soft–switched DC–AC Converters," IEEE Trans Ind. Applicat., vol. 34–4, pp. 847–860, Jul./Aug., 1998.

H. Mao, F. C. Lee, X. Zhou, and D. Boroyevich, "Improved Zero–Current Transition Converters for High Power Application," IEEE–IAS, Annu. Meet., Dec. 1996, pp. 1145–1152.

J. Wu, H. Dai, K. Xing, F. C. Lee, and D. Boroyevich, "Implementation of a 100KW Three–phase PFC Rectifier with ZCT Soft–Switching Technique," IEEE–PESC, Dec. 1999, pp. 647–654.

Y. Li, F. C. Lee, Jason Lai and Dusan Boroyevic, "Novel Zero–Current–Transition and Quasi–Zero–Voltage–transition (ZCT–QZVT) Three–Phase Inverter/Rectifier with Optimal Variable timing control," CPE–VT Seminar Dec. 1999.

P. Tomasin, "A Novel topology of zero–current switching voltage–source PWM inverter for high power applications," IEEE–PESC, Dec. 1995, pp. 1245–1251.

* cited by examiner (i) TURN-ON (ii) TURN-OFF (i) TURN-ON (ii) TURN-OFF

THREE-PHASE ZERO-CURRENT-TRANSITION (ZCT) INVERTERS AND RECTIFIERS WITH THREE AUXILIARY SWITCHES

CROSS-REFERENCE TO RELATED APPLICATIONS

This application claims priority to Provisional Application Ser. No. 60/171,096, filed on Dec. 16, 1999, the entire contents of which are herein incorporated by reference.

BACKGROUND OF THE INVENTION

1. Field of the Invention

The present invention generally relates to a zero-current-transition (ZCT) technique suitable for three-phase inverter and rectifier applications and, more particularly, to an improvement on a family of existing products, namely, three-phase-soft-switching inverters and rectifiers.

2. Description of the Prior Art

Three phase inverters (devices which convert direct current to three-phase alternating current) and rectifiers (devices which convert three-phase alternating current to direct current) have gained increased attention in recent times. In particular, efficient operation of such devices are of critical in applications such as AC adjustable speed drives for so-called zero-emission vehicles (i.e., electric and hybrid combustion/electric automobiles). Other applications include three-phase power factor correction (PFC) rectifier for DC power distribution systems as well as general purpose AC drives, utility power systems and uninterrupted power supplies (UPS).

The basic concept of zero current transition (ZCT) techniques is to force the current of an outgoing switch in a PWM power converter to zero prior to its turn-off. By using the ZCT techniques, converters can achieve a higher switching frequency with reduced switching losses and fewer electromagnetic interference (EMI) problems. The ZCT techniques are very attractive in high-power three-phase inverters and rectifiers where the minority-carrier devices, such as insulated gate bipolar IGBTs, are the power devices.

The ZCT commutation is usually assisted by some kind of auxiliary circuitry. The ZCT techniques are expected to be helpful to both turn-on and turn-off transitions of the main switch. The auxiliary switches should be soft-switched. Meanwhile, the schemes should not cause high voltage, current, or thermal stress on the devices and components.

As shown in FIGS. 1A–B, in existing three-phase ZCT inverters and rectifiers, six auxiliary switches ($S_{x1}$–$S_{x6}$) and correspondingly six gate-drivers for the auxiliary switches are needed, resulting in severe cost, layout, and reliability penalties. The consideration made in choosing a topology is that the independent commutation for each main switch should be retained such that the conventional space-vector pulse width modulation (PWM) schemes for hard-switching inverters and rectifiers can be directly employed without modification, and a possible sub-harmonic problem can be avoided. The existing three-phase ZCT topology shown in FIGS. 1A–B has this desired "piggy-back" feature, where each phase leg of the main circuit has a corresponding auxiliary circuit, including two auxiliary switches and one resonant tank consisting of an inductor 10 and a capacitor 12. In total there are six ($S_{x1}$–$S_{x6}$) auxiliary switches in a three-phase ZCT inverter/rectifier. A number of three-phase ZCT techniques are known. They actually have the same circuit topology as shown in FIGS. 1A–B, but employ different soft-switching schemes, resulting in different operations and features.

Besides the topology shown in FIG. 1, there are a few other ZCT-types topologies proposed, but they are not suitable for three-phase inverter/rectifier applications. For instance, topologies have been proposed that require a middle-point tapped resonant inductor to be in series with the main switch. In three-phase systems, such as AC motor drives, the load itself is inductive; consequently, it is impossible to insert a resonant inductor in the main power path.

In short, the topology shown in FIGS. 1A–B so far is the most suitable for the three-phase inverter and rectifier applications. However, it requires too many components- six auxiliary switches (and correspondingly six additional gate-drivers), resulting in severe cost, layout and reliability penalties.

SUMMARY OF THE INVENTION

New ZCT topologies are presented for three-phase inverter and rectifier applications. Compared to existing three-phase ZCT techniques, the number of auxiliary switches is reduced from six to three, while not altering the necessary device rating. Correspondingly, the number of gate-drivers for the auxiliary switches is also reduced to three. Meanwhile, the assets of the existing three-phase ZCT techniques are still retained, i.e., all the main switches and the auxiliary switches are turned on and turned off under zero-current conditions, and the independent communication for each main switch is achieved. The desired soft-switching features are achieved. Therefore, this invention will contribute to more cost-effective, reliable, and efficient high-performance three-phase inverters and rectifiers.

BRIEF DESCRIPTION OF THE DRAWINGS

The foregoing and other objects, aspects and advantages will be better understood from the following detailed description of a preferred embodiment of the invention with reference to the drawings, in which:

FIG. 17A is S=1920 rpm and T=50 N-m,

FIG. 17B is S=3770 rpm and T=101 N-m,

FIG. 17C is S=5680 rpm, T=42 N-m, and

FIG. 17D S=7550 rpm and T=31 N-m; and

DETAILED DESCRIPTION OF A PREFERRED EMBODIMENT OF THE INVENTION

Figure 1A:
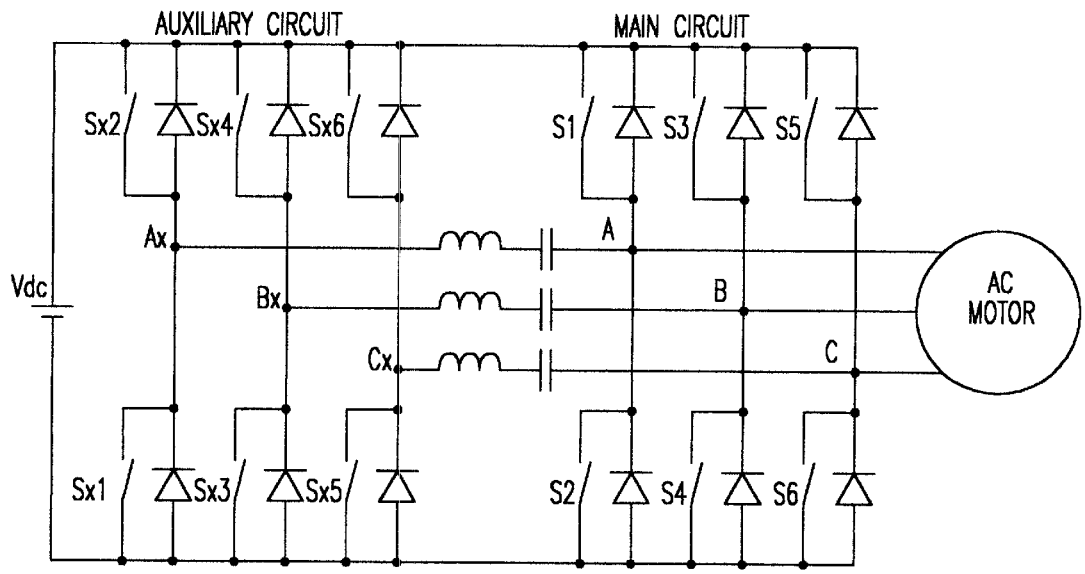
FIGS. 1A and 1B are circuit diagrams of prior art three-phase ZCT inverter topology and rectifier topology, respectively.

New three-phase ZCT topologies are proposed to simplify the existing techniques. Under the prerequisite of using the same rating device, the number of auxiliary switches is reduced from six to three in these new topologies. Correspondingly, the number of gate-drivers is also reduced to three. Meanwhile, the merits of the existing three-phase ZCT techniques still are retained, i.e., all the main switches and the auxiliary switches are turned on and turned off under zero-current conditions, and each main switch is commutate independently. The desired soft-switching features are achieved. Therefore, this invention will contribute to more cost-effective, reliable, and efficient three-phase inverters and rectifiers.

The immediate applications include the use in AC adjustable speed drives for electric vehicles propulsion systems and in the three-phase power factor correction (PFC) rectifier for DC power distribution systems. In addition, this invention can be applied to general purpose AC drives, utility power systems and UPS power supplies.

The disadvantage of the technique is that the load current section information is needed for gating the auxiliary switches properly. Fortunately, in the existing three-phase systems, the load current information has been be obtained for control purposes, such as torque and flux control in inverters for AC drives and current-loop control in PFC rectifiers. This information can be utilized further for realizing the ZCT operation. No extra hardware investment is needed.

Using ZCT techniques in three-phase inverter and rectifier applications, a higher switching frequency can be achieved with reduced switching losses, EMI, and audible noise. In addition, the power density and dynamic performance can be improved. However, the ZCT operations have to be assisted by some kind of additional devices, namely, auxiliary switches. The trade-off on the cost, complexity, and performance is a big challenge in the engineering implementation. This invention reduces the number of auxiliary switches and their gate-drivers to half of those of the existing techniques while still keeping the same soft-switching features of the existing techniques. The cost savings are obvious. Correspondingly, the circuit layout becomes much simpler, and thus the reliability is greatly enhanced. Therefore, the technical impact of this invention on the field of soft-switching techniques will be very significant.

As am example, taking a prototype as an example, there are enormous cost savings and attractive improvements on robustness and reliability. The prototype is a 50 KW three-phase ZCT inverter for electric vehicle (EV) propulsion. A 600V/150A IGBT is chosen as the auxiliary device. Its price is about $50 per unit; one gate-driver costs about $25. According to the existing techniques, six auxiliary switches and six corresponding gate-drivers have to be needed; according to this invention, only three auxiliary switches and three gate-drivers are needed. Therefore, $225 ($75×3) can be saved for one electric car.

Electric propulsion drives are key elements and indispensable components for EVs. EVs are in their infancy. An environmental concerns are propelling their development rapidly. It is predicted that the demand for EVs, in a populous state such as California, starting in 2003, 10 percent of the vehicles offered for sell would need to be in the zero-emission category. California alone will need approximately 800,000 zero-emission vehicles within the next 12 years. The total demand for EVs worldwide will be tremendous.

The trade-off on the cost, complexity, and soft-switching performance is a big challenge in the engineering implementation. In existing three-phase ZCT techniques, six auxiliary switches and six additional gate-drivers for the auxiliary switches are needed. In this invention, new three-phase ZCT topologies are proposed to simplify the existing techniques. Under the prerequisite of using the same rating devices, the number of auxiliary switches is reduced from six to three in these new topologies. Correspondingly, the number of gate-drivers is also reduced to three. Meanwhile, the merits of the existing ZCT techniques are retained, i.e., all the main switches and the auxiliary switches are turned on an turned off under zero-current conditions, and each main switch is commutated independently in a "piggy-back" manner. The desired soft-switching features are achieved. The technical impact of this invention on the field of soft-switching techniques will be very significant. The cost savings are obvious. The circuit layout becomes much simpler, and thus the reliability is much enhanced. Therefore, this invention will contribute to more cost-effective, reliable, and efficient high-performance three-phase inverters and rectifiers.

Figure 1B:
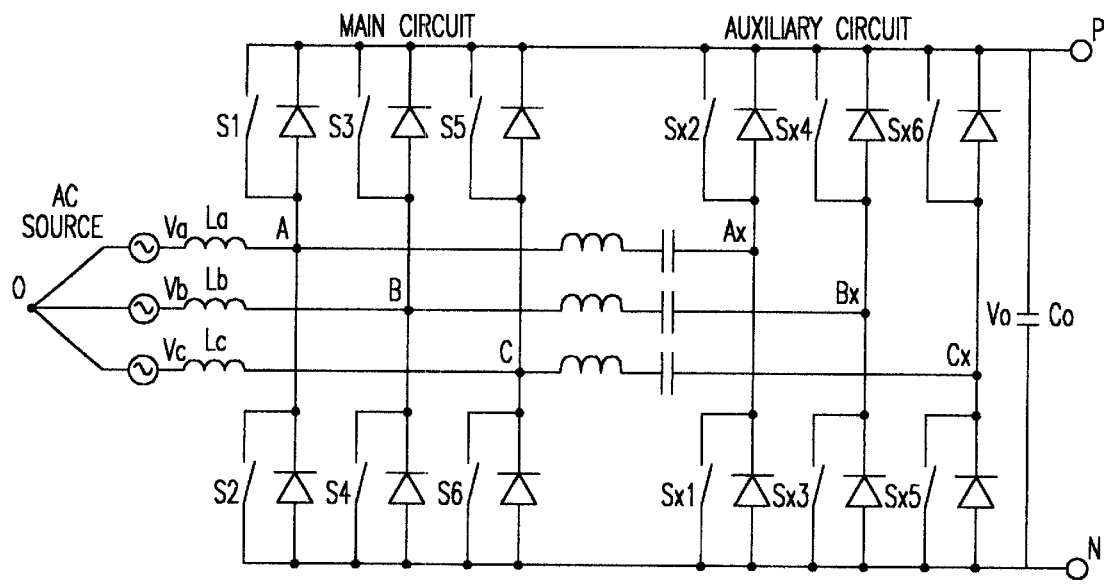

These new topologies have the "piggy-back" feature similar to the existing topology in FIG. 1.; i.e. each phase leg of the main circuit has a corresponding auxiliary circuit, accordingly achieving independent commutation of each main switch. However, in each auxiliary circuit, there is only one auxiliary switch, instead of two. In total, there are only three auxiliary switches, Sxa, Sxb and Sxc, each responsible for assisting the ZCT commutation of phases A, B, and C, respectively. Compared to the existing techniques where six auxiliary switches and corresponding six gate-drivers are required, the cost is greatly reduced, the circuit layout is much simplified and thus the reliability is enhanced.

Figure 2A:
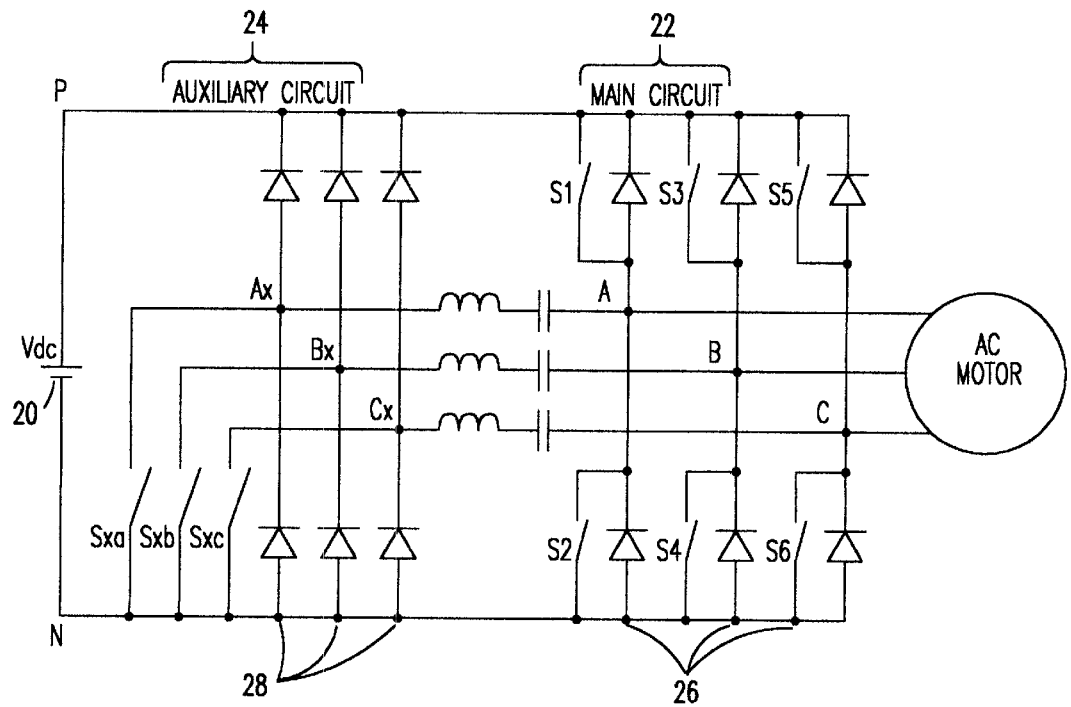
FIGS. 2A and 2B are circuit diagrams of a first embodiment of the three-phase ZCT inverter topology and rectifier topology, respectively, according to the present invention.
Figure 2B:
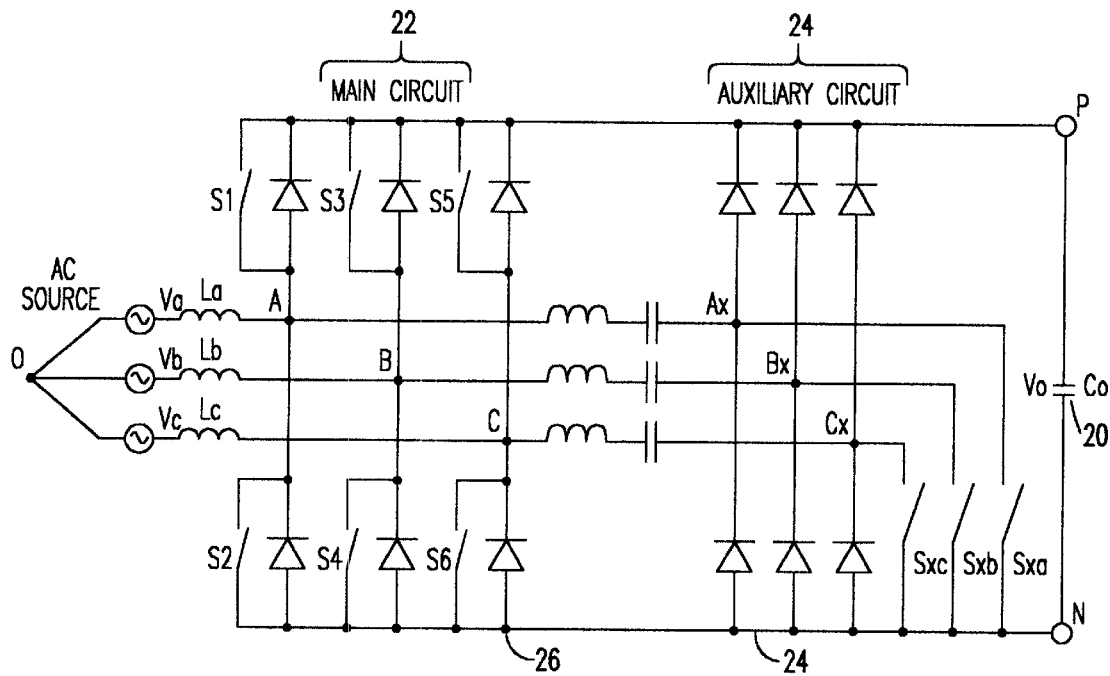
Figure 3A:
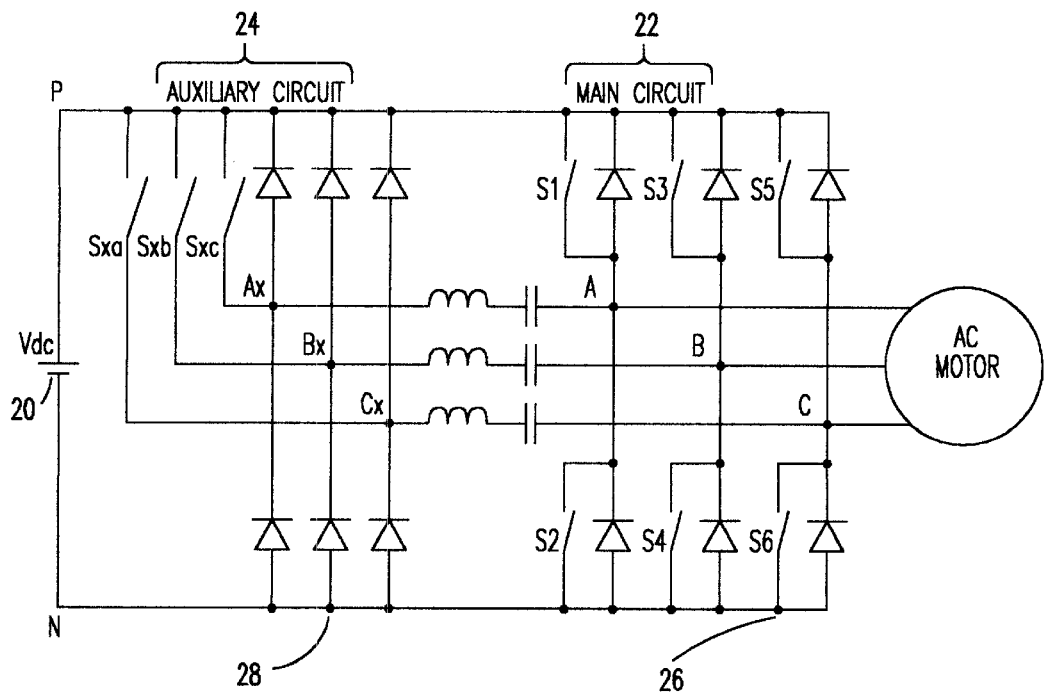
FIGS. 3A–B are circuit diagrams of a second embodiment of the three-phase ZCT inverter topology and rectifier topology, respectively, according to the present invention.
Figure 3B:
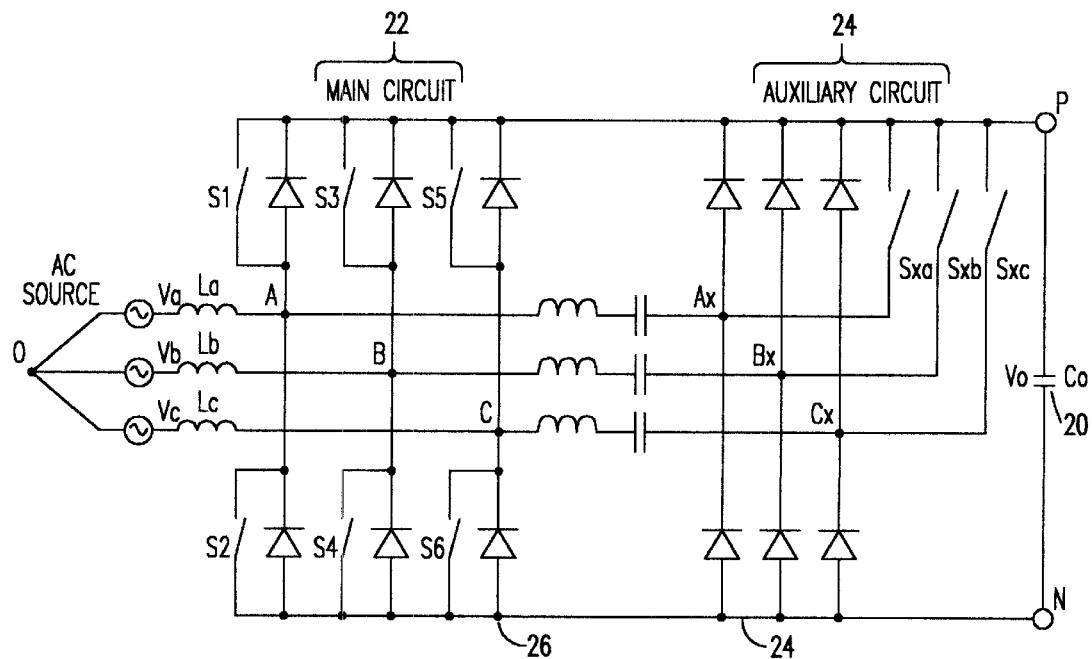

The first topology embodiment of the invention as shown in FIGS. 2A–B and the second topology embodiment of the invention as shown in FIGS. 3A–B are symmetrical to each other. From the view of the electrical circuit, the ZCT operations for both topologies are reciprocal. In the topology I of FIGS. 2A–B, the emitters of the three auxiliary switches, Sxa, Sxb, and Sxc are jointly connected to the negative rail of the DC bus; correspondingly, the three gate-drivers (not shown) for driving the auxiliary switches can be commonly grounded to the negative rail without isolation. On the other hand, in the topology II shown in FIGS. 3A–B, the collectors of Sxa, Sxb, and Sxc are connected to the positive rail of the DC bus; correspondingly, the three gate-drivers (not shown) for driving the auxiliary switches have to be separately grounded with sufficient isolation, and the EMI problems associated with the auxiliary circuit layout are more serious. Therefore, in normal cases, the topology I is preferable, and the following analysis will based on this topology. It will be shown that all the main switches and auxiliary switches still are turned on and turned off under the zero-current conditions.

Operational Principles

Since the inverter and rectifier are symmetrical to each other, this discussion will focus on the inverter, and it is also applicable to the rectifier. For example, as shown in FIG. 2A an electric conversion circuit is shown comprising a direct current terminal 20 connected between a positive DC rail P and a negative DC rail N. The main switching circuit 22 comprises three pairs of main switches (S1–S6), one pair for each of the three alternating current (AC) phases (A, B, and C). A parallel diode 26 is shown connected across each of the main switches (S1–S6). The auxiliary switching circuit 24 similarly comprises three pairs of diodes 28 connected between the positive DC rail P and the negative DC rail N, one pair for each of the three phases (A, B, and C). However, instead of three pairs of auxiliary switches (i.e., six switches), the auxiliary circuit 24 only comprises only three auxiliary switches ($S_{xa}$–$S_{xc}$), one pair for each of the three phases (A, B, and C). Each of the auxiliary switches are connected between the negative DC rail N and a center point between a respective pairs of diodes 28. Each of the three phases (A, B, and C) between the auxiliary circuit 24 and the main circuit 22 are connected by resonant tank comprising an inductor $L_x$ and capacitor $C_x$.

Figure 4:
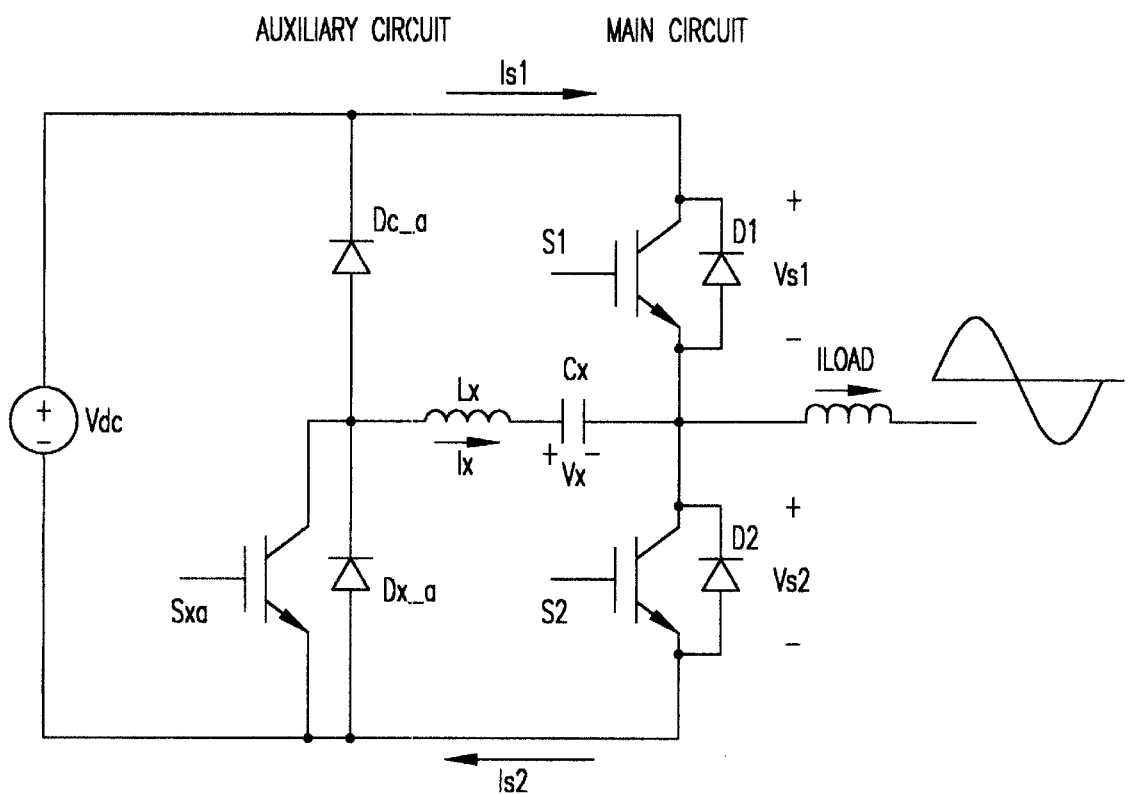
FIG. 4 is a circuit diagram of one phase leg of the ZCT inverter according to the present invention.

The operation of the new ZCT inverter is best illustrated by one phase leg circuit as shown in FIG. 4, where S1 and S2 are the main switches, Sxa is the auxiliary switch, Dc_a and Dx_a are the auxiliary diodes, and the serially-connected inductor, Lx, and capacitor, Cx, comprise the resonant tank. Note: in the following analysis, directions of the main switch currents, $I_{S1}$ and $I_{S2}$, the load current, $I_{Load}$, the resonant current, Ix, and polarities of the main switch voltages, $V_{S1}$ and $V_{S2}$, the resonant capacitor voltage, Vx, and the DC link voltage, Vdc, are referred to in FIG. 4.

Compared to the DC/DC converters, the PWM inverters for AC drives have some unique features, outlined as follows.

The two main switches on the same phase leg, S1 and S2, are activated complementary with some "dead-time" inserted between.

The inductive load current, $I_{Load}$, changes in a sinusoidal fashion during one alternate fundamental cycle, while it approximates a constant DC current within each switching cycle.

$I_{Load}$ is commutated in a "totem-pole" matter. $I_{Load}>0$ refers to the positive half alternate fundamental cycle, and vise versa. When $I_{Load}>0$, it is commutated through S1 and D2; thus S1 needs to be soft switched. When $I_{Load}<0$, it is commutated through S2 and D2; thus S2 needs to be soft switched.

The information of $I_{Load}$ has to be obtained for conventional control purposes, such as flux and torque control. This information can be taken for the soft-switching operations.

Because of these features, the soft-switching commutations for two main switches, S1 and S2, can be assisted by one auxiliary switch, Sxa. When S1 is turned off (while simultaneously S2 is turned on complimentarily) and when S2 is turned off (while Simultaneously S2 is turned on complimentarily), Sxa is activated for a short time. Depending on the directions of the $I_{Load}$, there are two cases for the soft-switching operations.

$I_{Load}>0$, The Positive Half-Alternate Fundamental Cycle

In this situation, when S1 is on and S2 is off complimentarily, the $I_{Load}$ flows through IGBT S1; when S1 is off and S2 is on complimentarily, the $I_{Load}$ free-wheels through diode D2. During this half positive fundamental cycle, soft-switching for S1 is the major concern.

Figure 5:
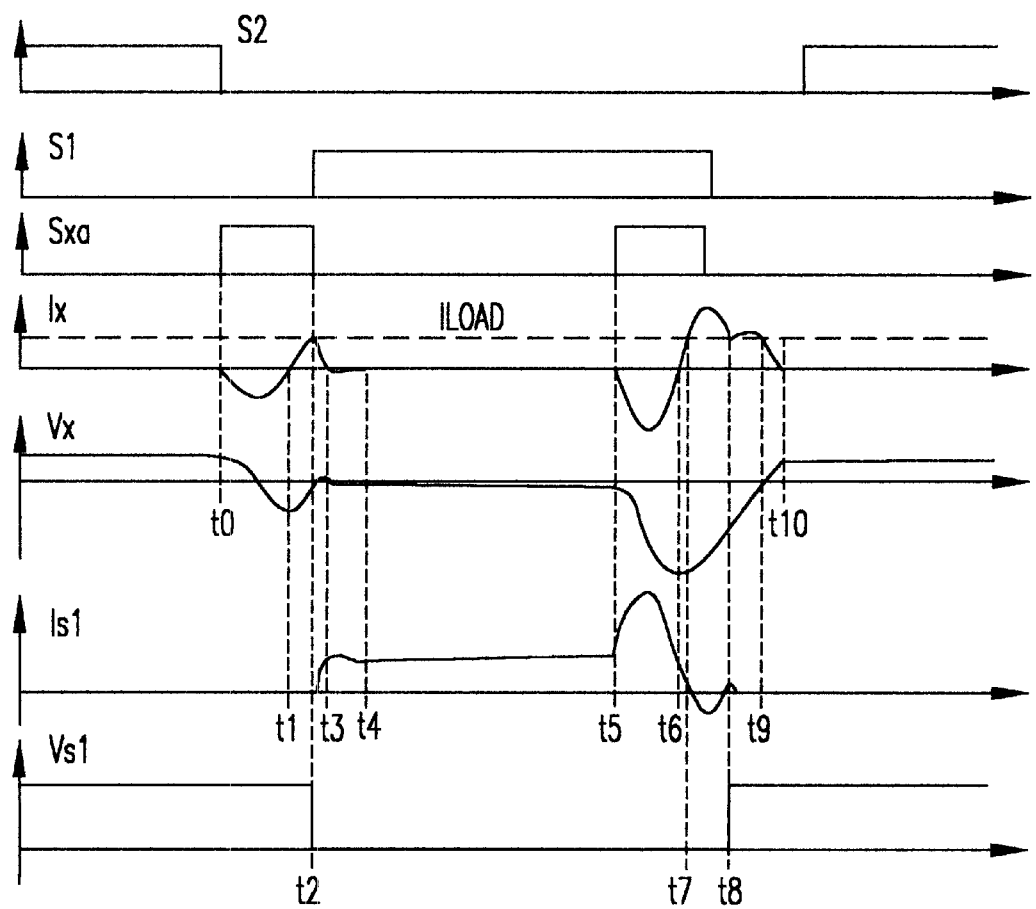
FIG. 5 is a graph illustrating the operational waveforms during $I_{LOAD}>0$.
Figure 6A:
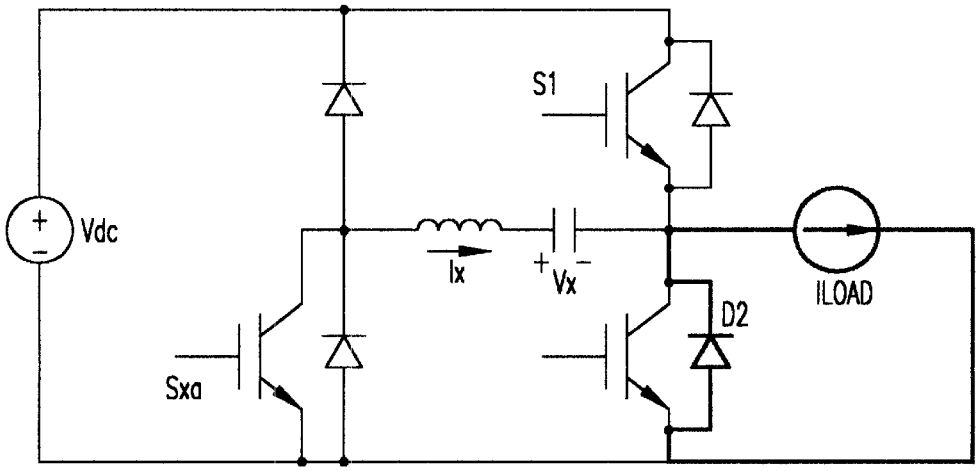
FIGS. 6A–K are circuit diagrams illustrating the topological stages of the soft-switching commutation during $I_{LOAD}>0$.
Figure 6B:
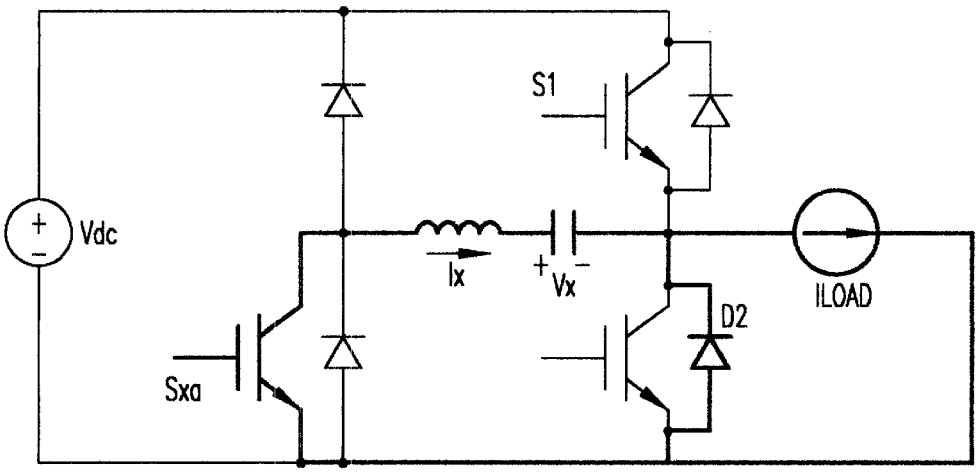
Figure 6C:
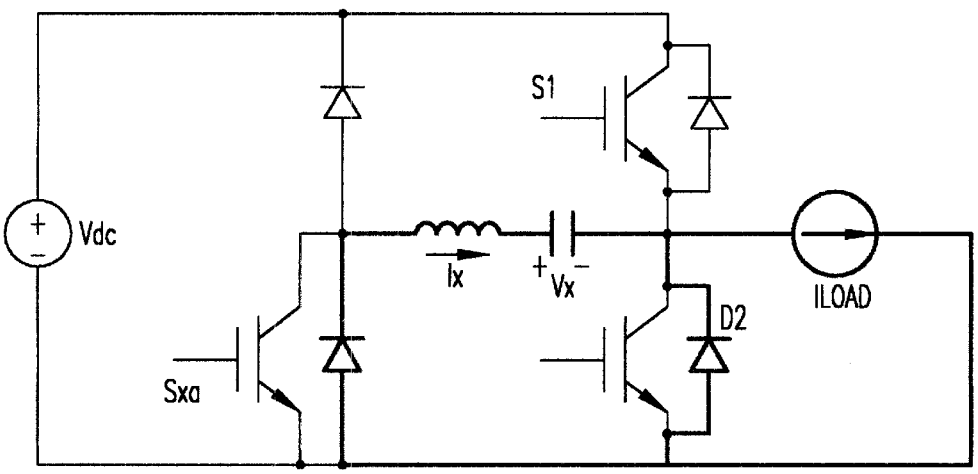
Figure 6D:
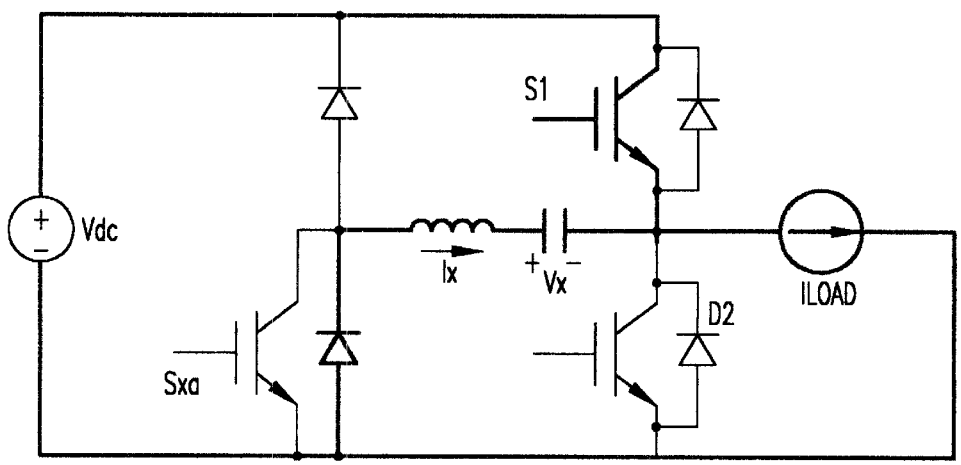
Figure 6E:
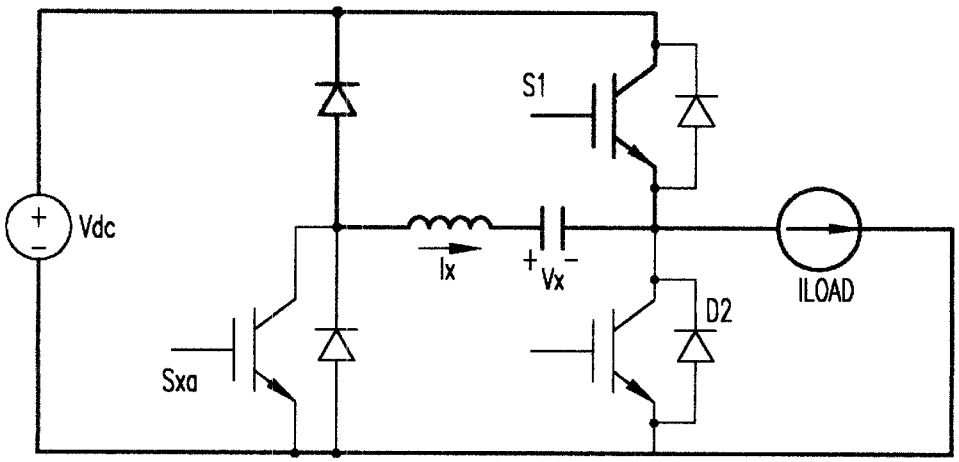
Figure 6F:
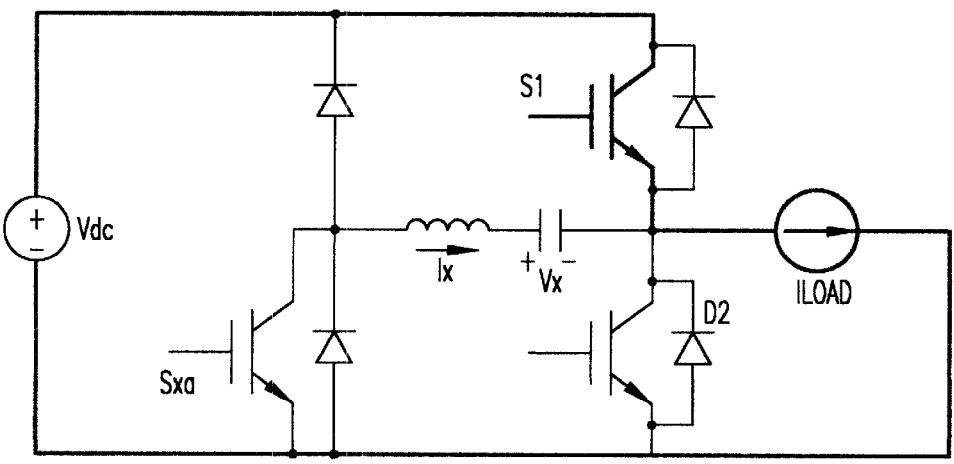
Figure 6G:
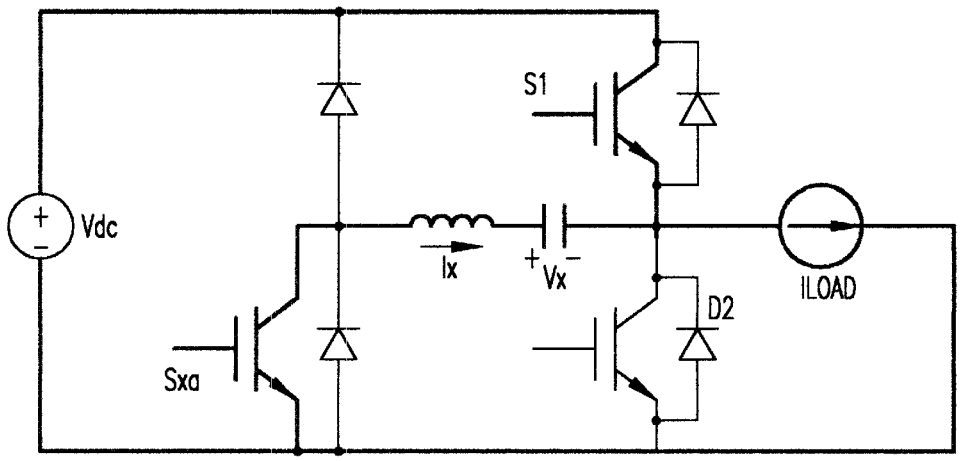
Figure 6H:
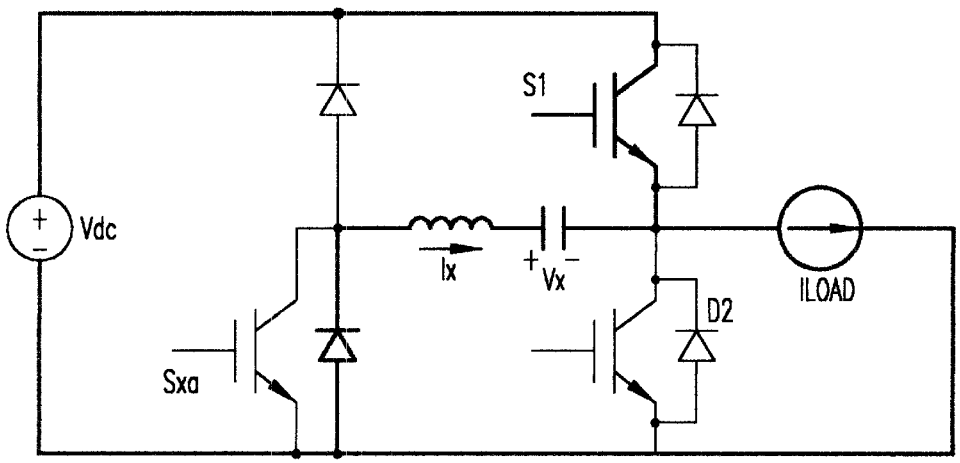
Figure 6I:
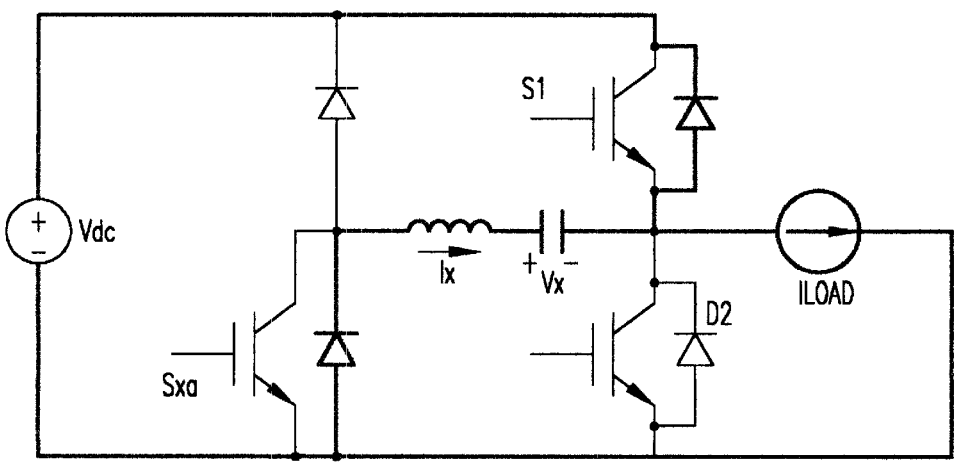
Figure 6J:
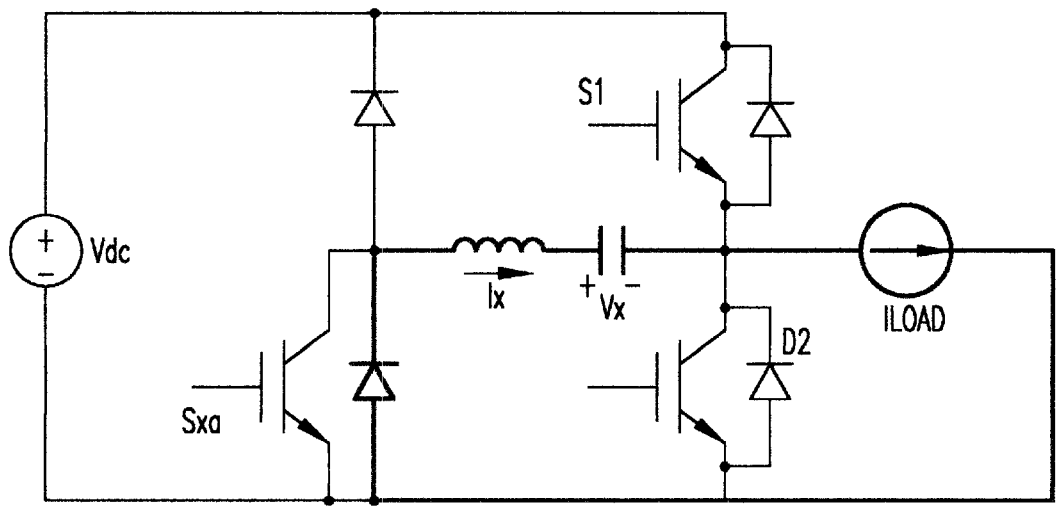
Figure 6K:
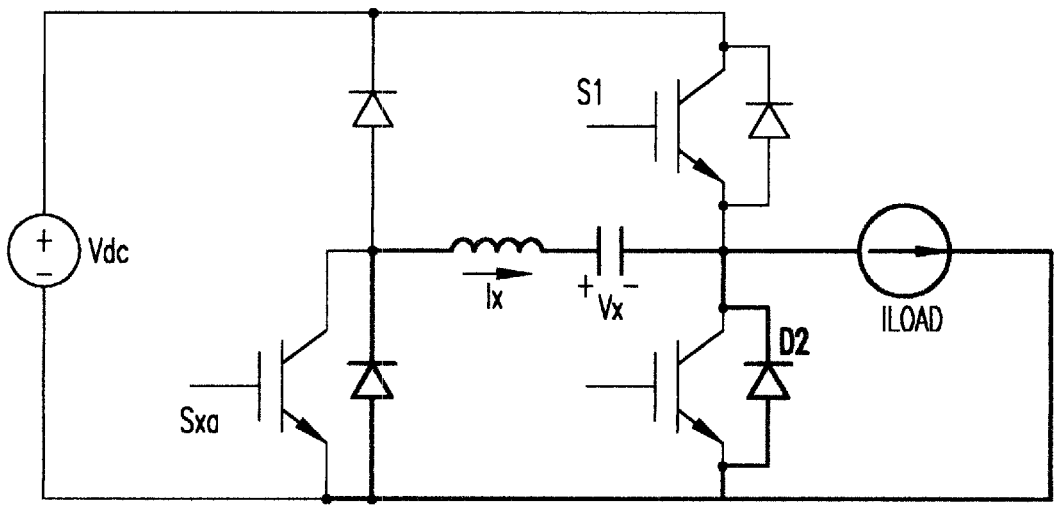

The initial situation is that $I_{Load}$ free-wheels through D2 and the resonant capacitor Cx is charged with a certain positive voltage, Vx, Vdc>Vx>0 (Vx cannot exceed Vdc, otherwise Dc_a would conduct; Vx cannot be negative, otherwise Dx_a would conduct). Before Sxa is turned on at t0, the gate-drive for S2 is removed. The corresponding simulated waveforms within one switching cycle are shown in FIG. 5. $I_{Load}$ and Vdc are assumed constant. The operation of the circuit goes through eleven different topological stages, as shown in FIGS. 6A–K (the bonded lines represent the actual current path).

Turn-On Transition I [t0,t1]: Sxa is turned on at t0, Lx and Cx start to resonate, and Ix negatively increases to peak then decreases to zero at t1.

Turn-On Transition II [t1, t2]: The resonance continues after t1. Ix reverses its direction and is conducted by Dx1. Sx1 can be turned off at the zero-current condition without much turn-off loss. As Ix positively increases, the current in D2 is diverted into the auxiliary circuit.

Turn-On Transition III [t2, t3]: Ix reaches its positive peak at t2 and D2 stops conducting; thus S1 is turned on under the zero-current condition at t2. The turn-on loss is largely reduced, since the diode reverse recovery is eliminated, and the rise rate of $I_{S1}$ after the turn-on is limited by Lx. After t2, Ix decreases rapidly toward zero, since Vdc is included in the resonant path.

Turn-On Transition IV [t3,t4]: At t3, Ix drops to zero, and Dx_a is turned off naturally. Since Vx is still positive, the auxiliary circuit continues resonating, and Ix becomes negative, conducted by Dc_a.

Switch-On Stage [t4, t5]: At t4, Ix returns to zero again, and Dc_a is turned off naturally. The auxiliary circuit stops resonating and is functionally disconnected from the main circuit. The load current flows through IGBT S1 and PWM operation resumes.

Turn-Off Transition I [t5, t6]: Before S1 is turned off, Sxa is turned on again at t5. Lx and Cx start to resonate again. Vdc is included in the resonant path. Ix is negative, and its magnitude increases to peak then decreases to zero at t6.

Turn-Off Transition II [t6, t7]: After t6, since the magnitude of Vx is greater than Vdc, the auxiliary circuit continues resonating. Ix becomes positive and the current of the main switch is diverted into the auxiliary circuit. Ix is conducted by Dx_a, and Sx_a is turned off under the zero-current condition.

Turn-Off Transition III [t7, t8]: At t7, Ix reaches $I_{Load}$ and the current in S1 is reduced to zero. As Ix keeps increasing, the surplus current flows through diode D1. The gate driver signal of S1 can be removed without much turnoff loss. Therefore, S1 is turned off at the zero-current condition.

Turn-Off Transition IV [t8, t9]: At t8, Ix falls to $I_{Load}$ and D1 stops conducting. Since D2 is still reverse biased, $I_{Load}$ can only flow through the resonant tank, charging the resonant capacitor linearly.

Turn-Off Transition V [t9, t10]: At t9, Vx is discharged to zero, and D2 starts to conduct. The resonant tank starts to resonate again. As Ix decreases towards zero, the current in D2 increases gradually.

Diode-On Stage [after t10]: When Ix drops to zero at t10, the auxiliary circuit stops resonating and is functionally disconnected from the main circuit. $I_{Load}$ is conducted by D2, and the inverter resumes its PWM operation. The gate-driver signal for S2 can be applied after t10.

$I_{Load}<0$, The Negative Half-Alternate Fundamental Cycle

In this situation, when S1 is on and S2 is off complimentarily, $I_{Load}$ free-wheels through diode D1; when S1 is off and S2 is on complementary, $I_{Load}$ flows through IGBT S2. During this half negative fundamental cycle, soft-switching for S2 is the major concern.

Figure 7:
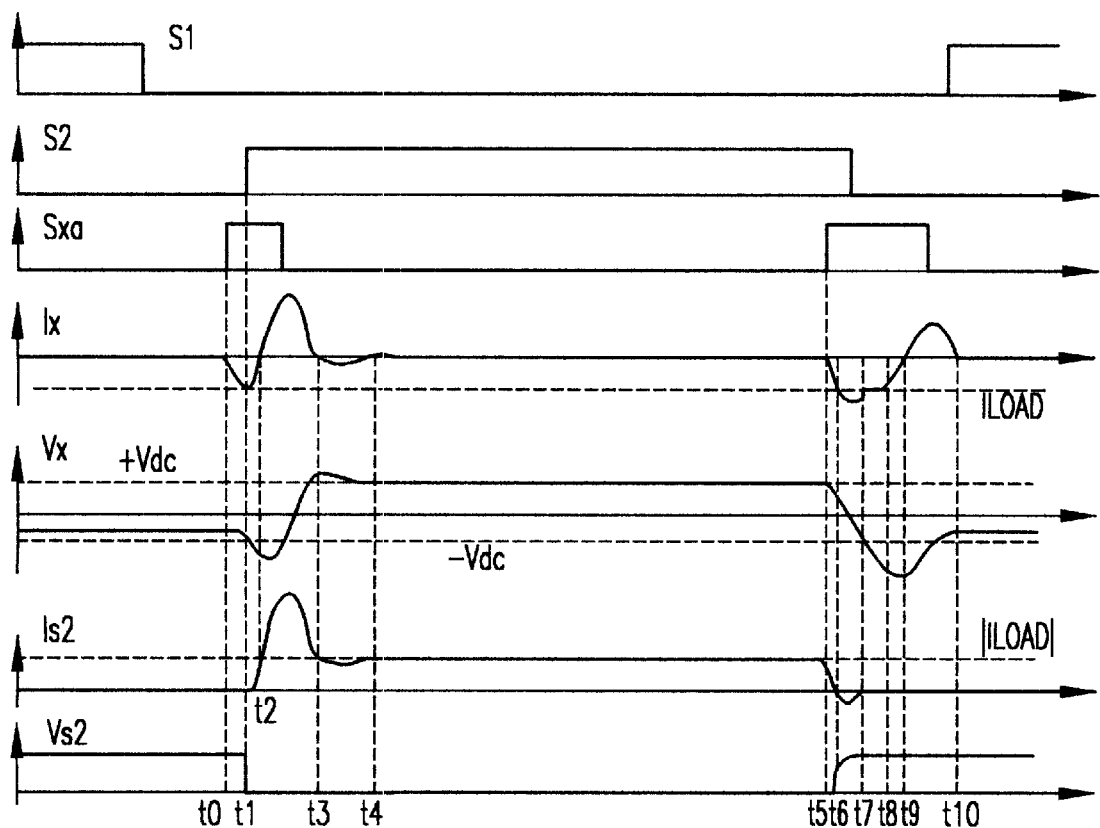
FIG. 7 is a graph illustrating the operational waveforms during $I_{LOAD}<0$.
Figure 8A:
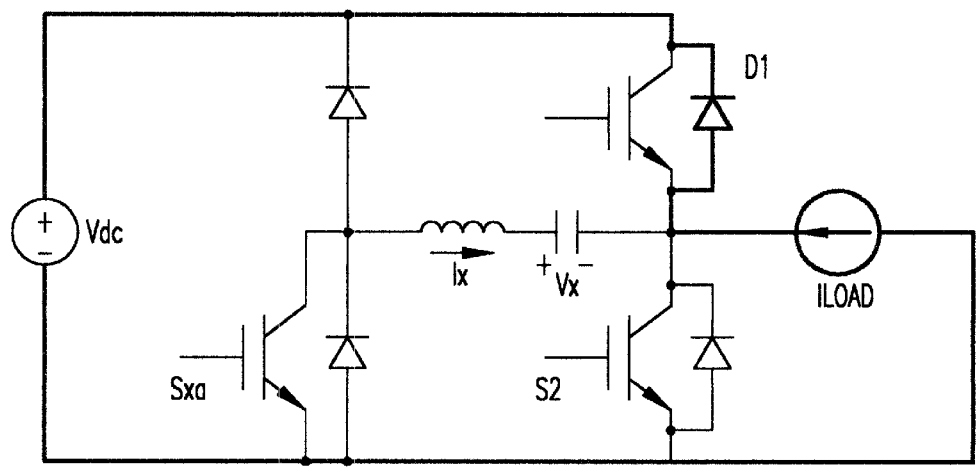
FIGS. 8A–K are circuit diagrams illustrating the topological stages of the soft-switching commutation during $I_{LOAD}<0$.
Figure 8B:
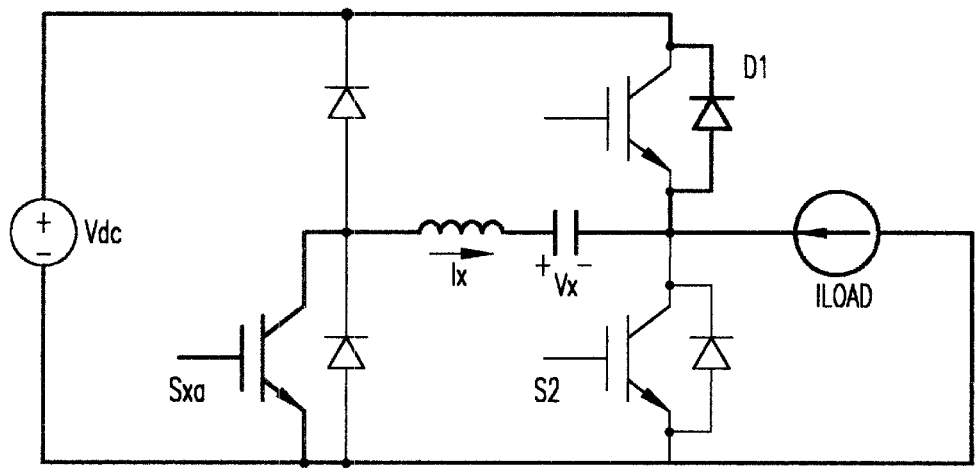
Figure 8C:
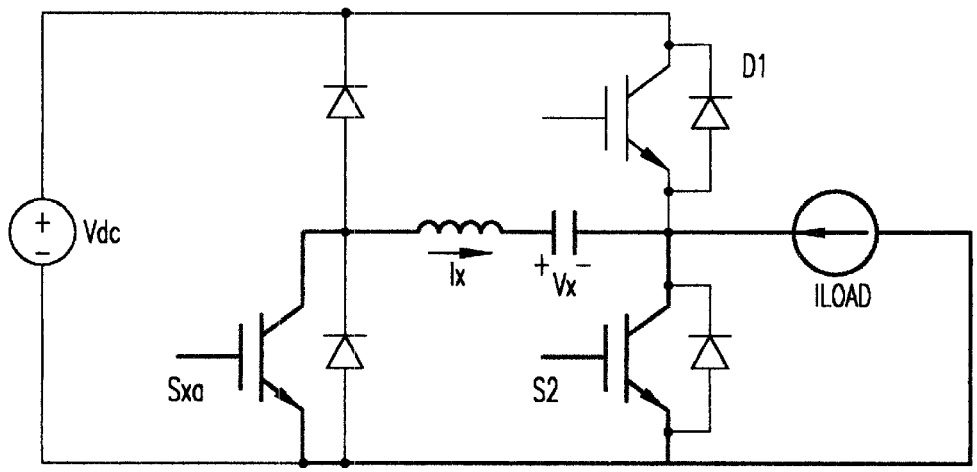
Figure 8D:
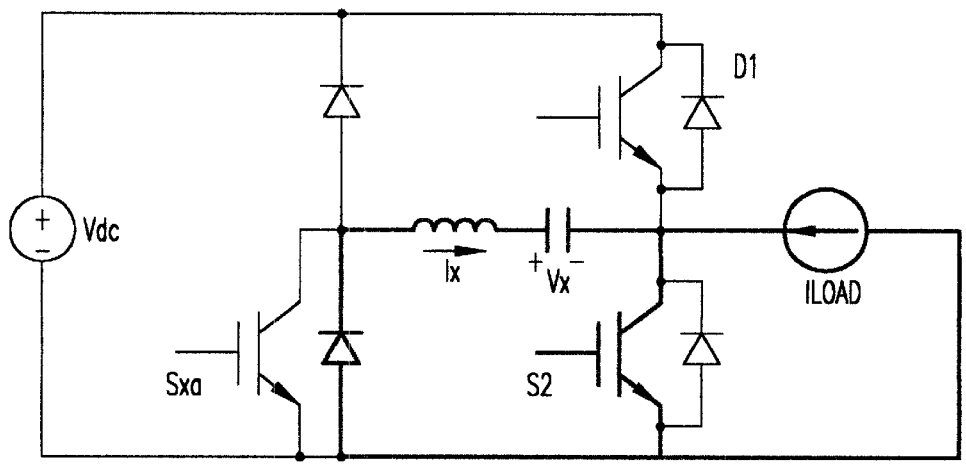
Figure 8E:
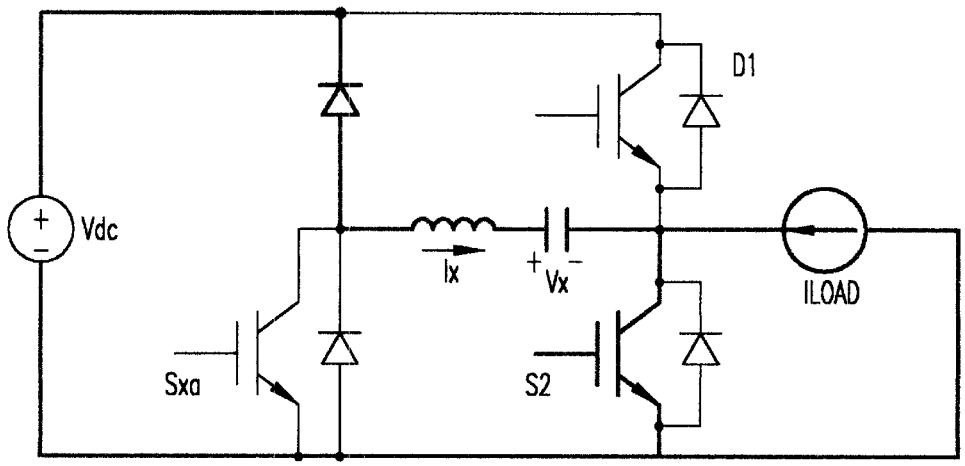
Figure 8F:
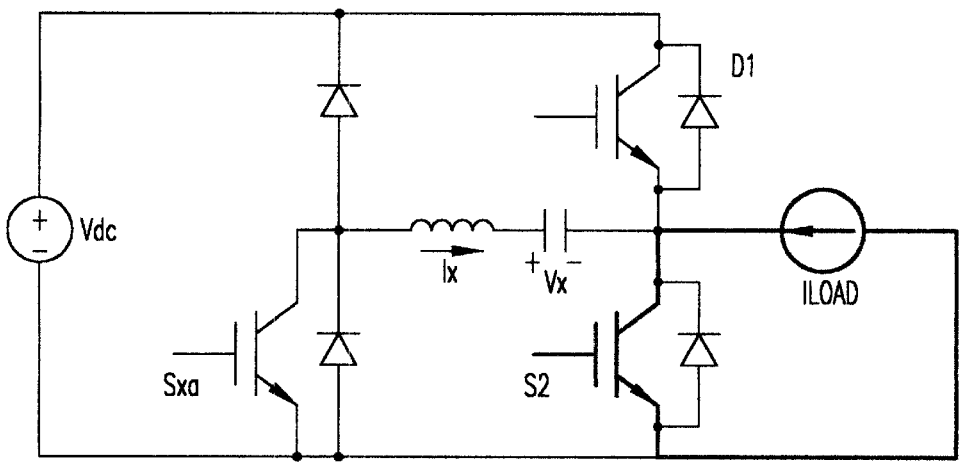
Figure 8G:
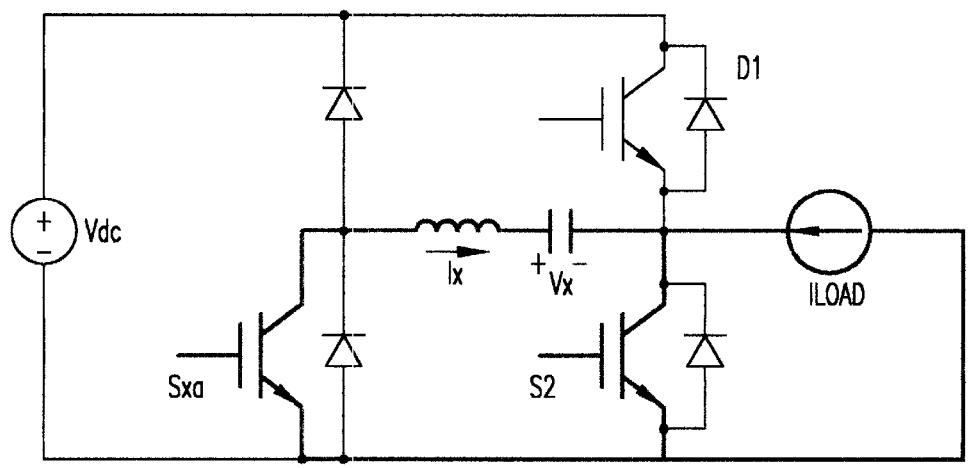
Figure 8H:
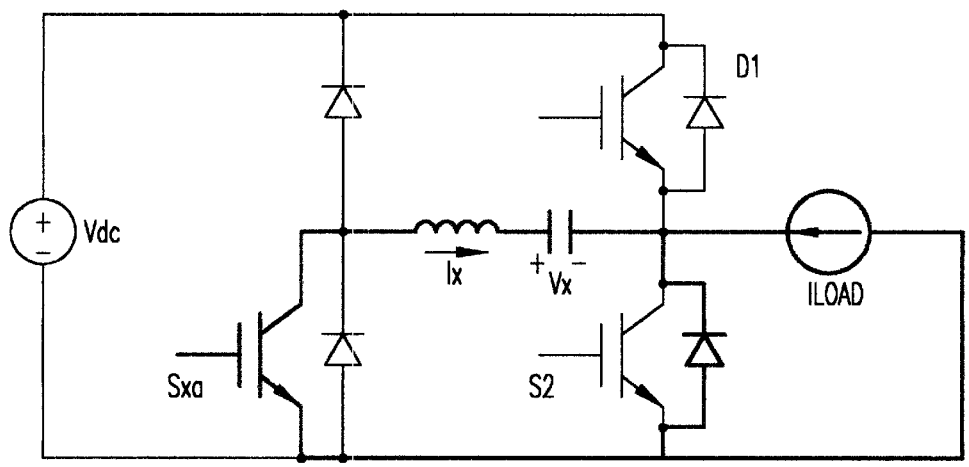
Figure 8I:
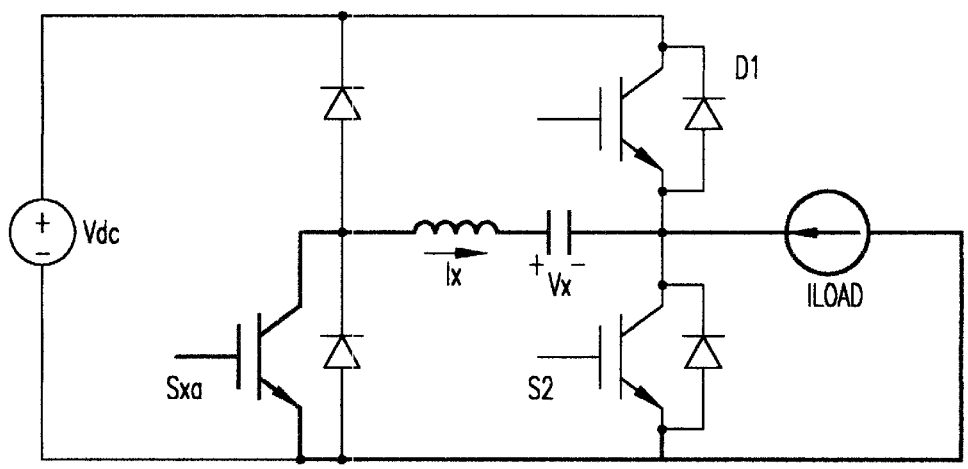
Figure 8J:
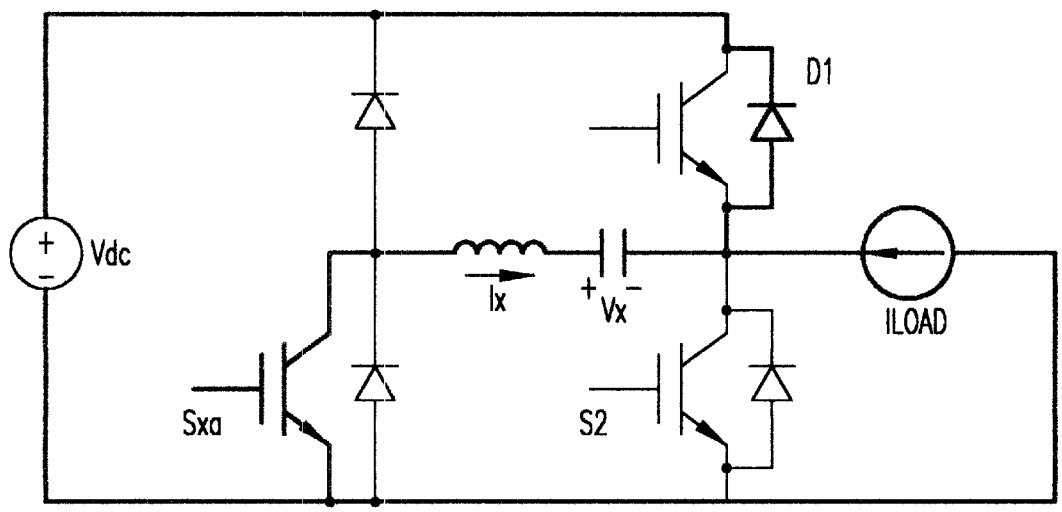
Figure 8K:
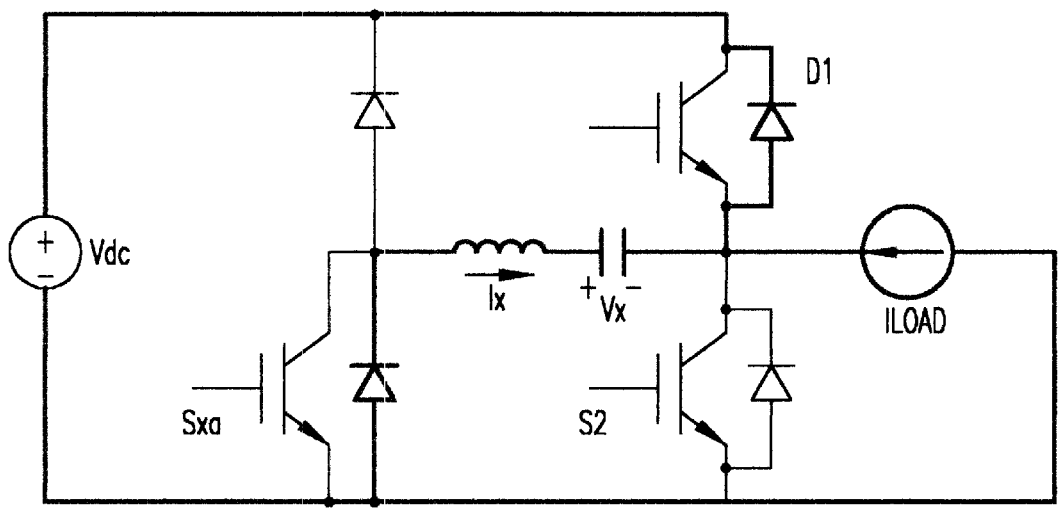

The initial situation for the soft-switching commutation is that $I_{Load}$ free-wheels through D1 and Cx is charged with a certain negative voltage, $-Vdc<Vx<0$ (Vx cannot be positive, otherwise Dc_a would conduct; the magnitude of Vx cannot exceed Vdc, otherwise Dx_a would conduct). Before Sxa is turned on at t0, the gate-drive for S1 is removed. The corresponding simulated waveforms within one switching cycle are shown in FIG. 7. The operation of the circuit goes through eleven different topological stages, as shown in FIGS. 8A–K (the bonded lines represent the actual current path).

Turn-On Transition I [t0, t1]: Sxa is turned on at t0, and Lx and Cx start to resonate. Ix is negative. As the magnitude of Ix increases, the current in D1 is diverted into the auxiliary circuit.

Turn-On Transition II [t1, t2]: Ix reaches its negative peak at t1 and the current in D1 is reduced to zero; thus S2 is turned on under the zero-current condition at t1. The turn-on loss is largely reduced, since the diode reverse recovery is eliminated, and the rise rate of $I_{S2}$ after the turn-on is limited by Lx. After t1, the magnitude of Ix decreases toward zero, since the resonant tank is short-circuited by the S2 turn-on.

Turn-On Transition III [t2, t3]: Ix drops to zero at t2 and the auxiliary circuit continues resonating. Ix becomes positive and is conducted by Dx_a. Sxa can be turned off at the zero-current condition without much turn-off loss.

Turn-On Transition IV[t3, t4]: Ix increases to peak and then decreases to zero at t3. Dx_a is turned off naturally. Since Vx is greater than Vdc, the auxiliary circuit continues resonating, and Ix, becomes negative, conducted by Dc_a.

Switch-On Stage [t4, t5]: At t4, Ix returns to zero again, and Dc_a is turned off naturally. The auxiliary circuit stops resonating and is functionally disconnected from the main circuit. the load current flows through IGBT S2, and PWM operation resumes.

Turn-Off Transition I [t5, t6]: Before S2 is turned off, Sxa is turned on at t5. Lx and Cx start to resonate again. Ix is negative. Its magnitude increases toward peak, and the current in S2 is diverted into the auxiliary circuit.

Turn-Off Transition II [t6, t7]: After t6, Ix reaches $I_{Load}$ and the current in S2 is reduced to zero. As the magnitude of Ix keeps increasing, the surplus current flows through diode D2. The gate-driver signal of S2 can be removed without much turnoff loss. Therefore, S2 is turned off at the zero-current condition.

Turn-Off Transition III [t7, t8]: At t7, Ix falls to $I_{Load}$, and D2 stops conducting. Since D1 is still reverse biased, $I_{Load}$ can only flow through the resonant tank, charging the resonant capacitor linearly.

Turn-Off Transition IV [t8, t9]: At t9, Vx is charged to Vdc, and D1 starts to conduct. The resonant tank begins to resonate again. Ix is still negative. As its magnitude decreases toward zero, the current in D1 increases gradually.

Turn-Off Transition V [t9, t10]: Ix reaches zero at t10. Since Vx is negative and its magnitude is greater than Vdc, the auxiliary circuit continues resonating. Ix becomes positive, conducted by Dx_a, and Sxa is turned off at the zero-current condition.

Diode-On Stage [after t10]: When Ix drops to zero at t10, the auxiliary circuit stops resonating and is functionally disconnected from the main circuit. $I_{Load}$ is conducted by D1, and the inverter resumes its PWM operation. The gate-driver signal for S1 can be applied after t10.

It should be pointed out that the ZCT commutation during $I_{Load}>0$ is equivalent to the DC/DC-mode high-frequency operation of the ZCT technique proposed in H. Mao et al., Improved Zero Current Transition Converters for High Power Applications, *IEEE-IAS, Annual Meet.*, 1996, pp. 1145–1152. However, the ZCT technique in there was originally proposed for DC/DC converters, and its use has been directly extended to the three-phase inverters and rectifiers. In the three-phase ZCT inverter/rectifier proposed in Mao, six auxiliary switches are used, as shown in FIG. 1. The new ZCT topologies utilized in this invention are proposed based on the three-phase inverter/rectifier applications. Here, only three auxiliary switches are needed for a three-phase ZCT inverter/rectifier; meanwhile all the main switches and the auxiliary switches still are turned on and turned off under zero-current conditions, and the independent communication for each main switch is achieved.

State Plane Analysis

Figure 9B:
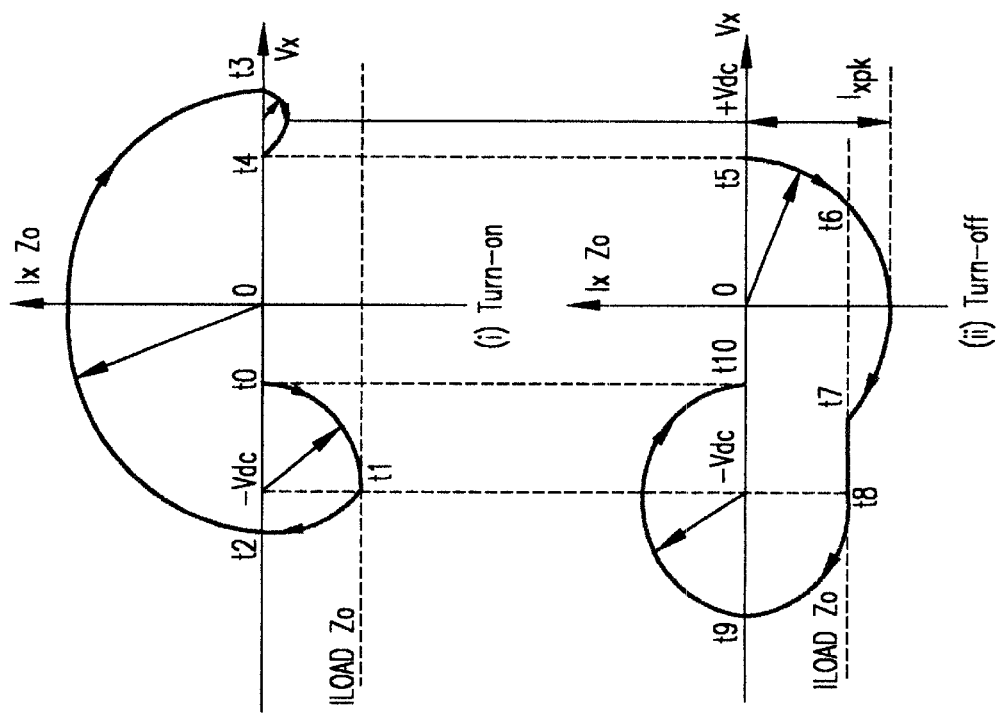
FIGS. 9A–B are state plane trajectories of the ZCT operations.
Figure 9A:
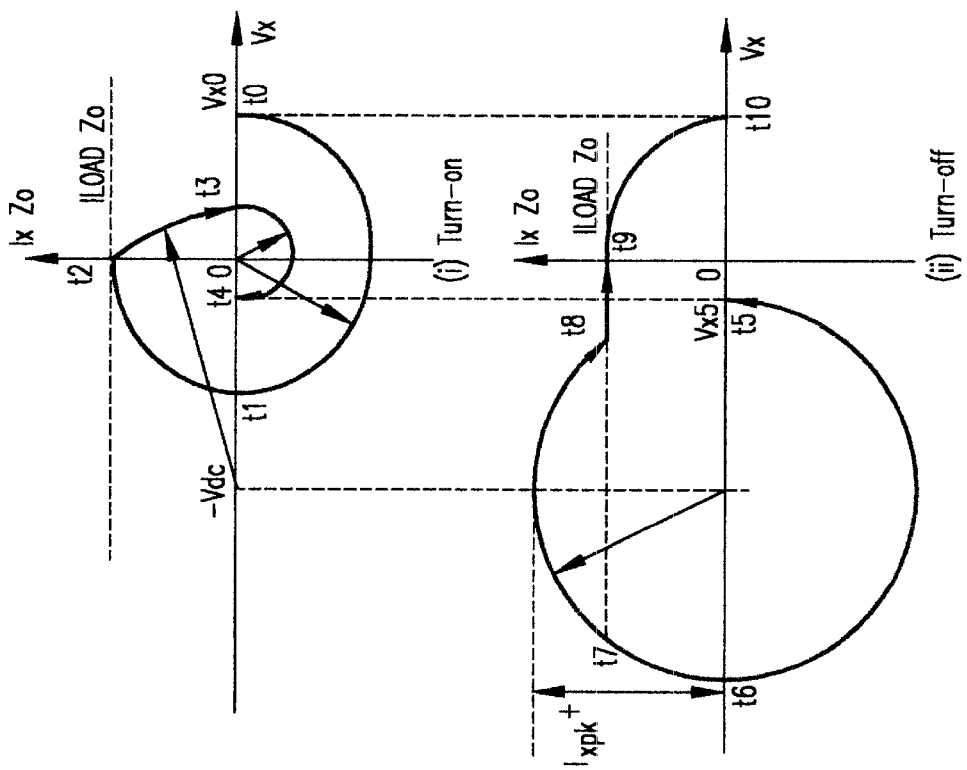

A simple and straightforward analysis on the above ZCT operation can be easily obtained by means of the state plane technique. From the above operational principles, the state plane trajectories of the turn-on transition and turn-off transition for both the $I_{Load}>0$ and $I_{Load}<0$ cases are separately plotted in FIGS. 9A–B, respectively. The variables of the state plane are Vx and IxZo, where $$Z_0 = \sqrt{\frac{L_x}{C_x}}$$

is the characteristic impedance of the resonant tank.

A) Turn on Transition [t0,t4]

$I_{Load}>0$

Sxa is turned on a t0 and the auxiliary circuit starts to resonate. Ix reverses its direction after ½ of a resonant cycle at t1; after ¾ of a resonant cycle at t2m Ix is equal to $I_{Load}$ and the current in the main switch, S1, drops to zero.

Correspondingly, in order to ascertain that S1 is turned on and the auxiliary switch, Sxa, is turned off under zero-current conditions, the on time width of Sxa, $T_{x-on}$, should be $\frac{3}{4} \cdot T_0 \geq T_{x-on} > \frac{1}{2} \cdot T_0$, and the delay time between the Sxa turn-on and the S1 turn-on should be $\frac{3}{4} T_0$, where $T_0$ is the resonant cycle, $T_0 = 2\pi\sqrt{L_x C_x}$.

$I_{Load}<0$

Sxa is turned on at t0 and the auxiliary circuit starts to resonate. After ¼ of a resonance cycle at t1, Ix equals $I_{Load}$ and the current in the main switch, S2, drops to zero Ix reverses its direction after t2. The time elapsed from t1 to t2 is very short.

In order to ascertain that S2 is turned on and Sxa is turned off under zero-current conditions, the on time width of Sxa can be chosen to be around ½T₀ (Sxa is turned off between t2 and t3), and the delay time between the Sxa turn-on and the S2 turn on should be ¼T₀.

B) Turn-Off Transition [t5,t10]

$I_{Load} > 0$

Sxa is turned on at t5 and the auxiliary circuit starts to resonate. After ½ of a resonance cycle at t6, Ix reverses its direction. After t7, Ix exceeds $I_{Load}$, the current in S1 drops to zero, and the surplus current flows through D1.

In order to ascertain that both S1 and Sxa are turned off under zero-current conditions, both the on time width of Sxa and the delay time between Sxa turn-on and S2 turn-off can be chosen to be around ¾T₀.

$I_{Load} < 0$

Sxa is turned on at t5 and the auxiliary circuit starts to resonate. Before Ix reaches its peak through ¼ of the resonance cycle, Ix exceeds $I_{Load}$ at t6, the current in S2 drops to zero, and the surplus current flows through D2. Ix reverses its direction after t9. The time elapsed from t5 to t9 is more than ½T₀, since a linear changing period, [t7,t8], is included.

In order to ascertain that both S2 and Sxa are turned off under zero-current conditions, the on time width of Sxa can be chosen to be around ¾T₀ (Sxa is turned off between t9 and t10), and the delay time between Sxa turn-on and S2 turn-off can be chosen to be around ¼T₀.

Design Considerations

Resonant Tank

Since the turn-off transition is more critical than the turn-on transition, the turn-off requirement is the major consideration for designing the resonant tank. In the following analysis, the design is based on the maximum load current subjected to the ZCT commutation, donated as Imax. To ascertain the ZCT turn-off for the main switches, the resonant current peak at the turn-off transition, Ixpk, must be larger than Imax.

However, the ZCT operations under the different load current directions look different, and the control timings are also different. There is only one resonant tank in one phase leg. One may wonder if the design of the resonant tank can satisfy both the ZCT operations.

As illustrated in the state place trajectory in FIG. 9, during $I_{Load} > 0$, the turn-off transition starts at t5, and Vx at t5 is very small. Vdc is included in th resonant path. Assuming Vx is zero at t5, without losing much accuracy, Ixpk can be estimated as $I_{xpk}^+ \approx Vdc/Z_o$ On the other hand, during $I_{Load} < 0$, the turn-off transition starts at t5, and Vx at t5 is very close to Vdc. The resonant path is short-circuited. Without losing much accuracy, Ixpk can also be estimated as $I_{xpk}^- \approx Vdc/Z_o$ Obviously, under the different load current directions, the design requirements for the resonant tank actually are the same. For design purposes, one variable, K, is defined as $$K = \frac{I_{xpk}}{I_{max}}$$

Another variable to be considered is the resonant time period T₀. The selection of K and T₀ is device-dependent. K and T₀ should make the turn-off time be long enough to ensure that the minority carrier in the device is recombined properly, but the turn-off time should not be too long; otherwise high circulating energy would be created. Typically for 600V/300A class IGBTs, K is around 1.2~1.8, and T₀ is around 3~6 us.

Combining (1) to (3), Zo is determined as $$Z_o = \frac{Vdc}{(K \cdot I_{max})}$$

The resonant tank is then designed as $$L_x = Z_o \frac{T_o}{2\pi}$$

$$C_x = \frac{L_x}{Z_o^2}$$

As in most conventional applications, the main switch is selected based on the average current rating, or the thermal ability of the devices. But the selection of the auxiliary devices is different. Since the auxiliary switches are only activated for a short time at the main switch turn-on and turn-off transitions, the average auxiliary switch current is very low. Meanwhile, the auxiliary switches need to conduct a narrow, high-peak resonant current. Consequently, the selection of the auxiliary devices is based on the peak current ability of the devices, instead of on the average current rating.

In the newly proposed ZCT topologies, the number of auxiliary switches needed is reduced to three from six in the existing ZCT techniques. However, the current ratings of the auxiliary devices do not need to be increased. The maximum resonant current peak in the newly proposed ZCT topologies actually is the same as in the existing ZCT techniques.

DESIGN AND EXPERIMENTAL RESULTS OF A 50-KW THREE-PHASE PROTOTYPE FOR EV MOTOR DRIVES

In order to demonstrate the proposed ZCT topology with three auxiliary switches in motor drive applications, a 50-kW three-phase voltage-source prototype inverter is designed using the circuit shown in FIG. 2.

System Configuration

The system is developed for EV motor drives. It comprises a battery pack, the ZCT inverter, and a three-phase induction motor. The required continuous output power is 30 kW, and the peak output power is 50 kW. The nominal DC bus voltage from the battery pack is 325 V.

Figure 10:
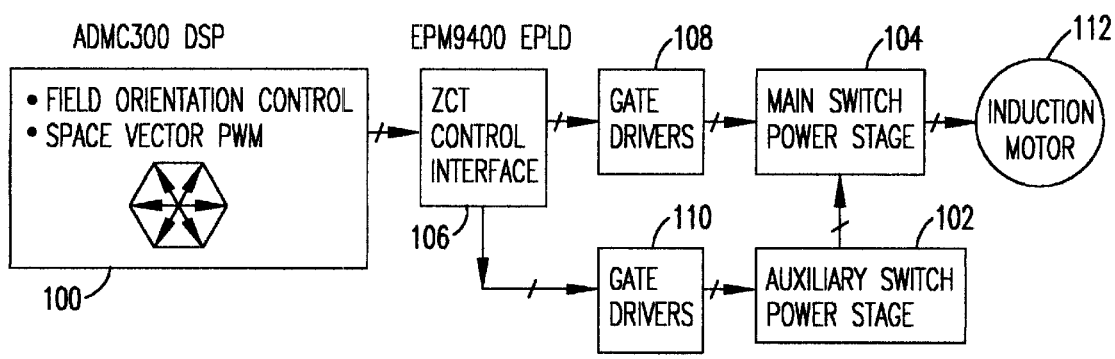
FIG. 10 is a block diagram of a 50-kW three-phase ZCT inverter according to the present invention used in a motor drive application for an electric car.

The inverter diagram is illustrated in FIG. 10. The universal field orientation (UFO) and space vector modulation (SVM) are used for the closed-loop induction motor drive 112, which are realized in a main control board with an ADMC300 DSP 100. General inverter system-level functions, such as the A/D scaling, torque/speed limitation, input/output ports management, communication, and fault protections, are also implemented in this board. Since the auxiliary switches 102 need to be activated for a short time before the main switch 104 transitions, the main control signals generated in the DSP are passed to an interface board with an Altera EPM9400 EPLD. The ZCT control timings are stored as a table in the memory of the DSP. Based on the load current directions, the control timing parameters are looked up in the table and transferred to the EPLD 106. Using the updated timing parameters, the EPLD generates control signals for both the main and auxiliary switches (104, 102), and send them to the corresponding gate driver boards (108 and 110). Since the load current information is already available from other control functions of the motor drive, no additional sensors are required for the ZCT timing control.

Still referring to FIG. 10, there is shown a diagram of the 50-kW ZCT inverter with three auxiliary switches for EV motor drives. As discussed earlier, the proposed ZCT inverter circuit does not require modification to conventional SVM schemes developed for hard-switching inverters. Consequently, the DSP program is designed to be a piggyback structure. Compared to the DSP program that would be designed for hard-switching inverters, the only difference is the addition of the control timing table that is stored in the memory of the DSP. As a matter of fact, by setting all the time widths of the auxiliary switching in the table to zero, the same DSP code can also be used for hard-switching inverters. This piggyback structure provides simple and flexible implementation for soft-transition inverters.

Circuit Design a) Compatibility with Hard-Switching Inverters

Based on the dc-bus voltage and power requirements, three pieces of Toshiba MG30OJ2Y50 (600 V/300 A, half-bridge IGBT module) are selected as the main switches. The compatibility issues caused by the soft-transition topology, however, need to be addressed. There are two big concerns: the dc-bus capacitor bank and the gate driver requirement. The dc-bus capacitor bank in the ARCP inverter (51 needs significant modification, both electrically and mechanically, because the ARCP inverter requires a midpoint in the dc bus voltage. In contrast, the proposed ZCT inverter does not have this kind of special requirement; thus, the dc capacitor bank that is designed for hard-switching inverters can be directly used. In the 50-kW ZCT inverter we designed, the dc-bus capacitor bank is composed of two 150-g/600-V polypropylene film capacitors in parallel. There are considerations given to the gate drivers of the auxiliary switches. In the proposed ZCT topology, there is no current path to directly short-through the auxiliary switches and the dc bus. As a result, there is no need for a de-saturation protection (de-sat) function that is conventionally built in the IGBT gate drivers. As shown in practical experience, the de-sat circuit is normally a major noise source in a high-power inverter, because the protection circuit of the entire inverter is very prone to be falsely triggered, even when there is no real short-through. Therefore, in the inverter design, the de-sat circuits are removed from the gate drivers of the auxiliary switches. The proposed ZCT topology not only reduces the number of auxiliary switches from six to three, but also simplifies the gate driver design, and enhances the reliability of the inverter system.

b) Design of the Resonant Tank Parameters

Since the EV drive covers a wide torque and speed range with changing power factors, it is important to discuss the soft transition operation over a variable instantaneous load current $I_{Load}$. For ZVT inverters, such as the ARCP inverter, where a snubber capacitor is connected directly across the switch, the switch must be turned on only at zero-voltage for each switching event; otherwise, the energy stored in the snubber capacitor will dump directly into the switch, causing excessive turn-on loss. For the ZCT commutation, the resonant current peak $I_{xpk}$ is mainly determined by the dc-bus voltage and the resonant tank impedance. To achieve zero-current turn-off, $I_{xpk}$ needs to exceeds $I_{Load}$. If $I_{xpk}$ is less than $I_{Load}$, clearly the switch can not be turned off at zero-current. Unlike the ZVT inverters, however, if the zero-current turn-off condition is lost, the switch can still be safely turned off, with a reduced, but not totally eliminated, switching loss. On the other hand, under light load conditions, the switch loss is relatively small. If $I_{xpk}$ is too high compared with unnecessary circulating energy and conduction loss will be caused by the ZCT commutation, although the switch can be turned off at zero current.

With these considerations in mind, the design of the resonant tank should aim to achieve an optimal efficiency over the entire speed/torque range of EV drives, with a proper trade-off between switching losses and conduction losses. There are several considerations for determining the maximum load current value subjected to the zero-current turn-off, based on which the resonant tank parameters are designated: the power rating of the inverter; the power factor; and the SVM scheme.

The required peak output power is 50 kW, and the continuous output power is 30 kW. The latter is used to determine the current value. A power factor of 0.85 is assumed for the induction motor drive. The six-step SVM will be employed for the inverter control, which keeps one main switch closed within each 60° sector and modulates duty cycles of the other two phases to regulate the output voltage. Within one sector, the phase with the highest current is the one that is left on to avoid the high switching losses. The modulation index is set as 0.86. With these considerations, the $I_{max}$, is determined as 200 A for this design case.

The main switch is chosen as the MG300J2YS50 IGBT. From both data sheet and device testing results, its typical turn-off time is around 0.30~0.5 $\mu$s. The resonant time period T is chosen as 4.5 $\mu$s, and the design variable K can be chosen around 1.2~1.4. For this design case, the resonant tank parameters are determined as $C_x$=0.625 $\mu$F and $L_x$=800 nH.

c) Design of the Resonant Inductor

A one-turn inductor structure is chosen in order to minimize the core loss at high-frequency operation and to avoid saturation with a high-peak resonant current. Since the inductance required for the resonance in only 800 nH, the stray inductance caused by the inverter layout should be counted into the total inductance. Both theoretical analysis and experimental measurements show that the inductance of a one-inch-long AWG 20 wire is about 20 nH, and that of a one-inch-long 0.3-inch wide 32-mil-thick copper foil is about 15 nH at a high-frequency range (100 kHz–500 kHz). The difference is caused by the high-frequency parasitic capacitor effect. In the inverter power stage, the distance from the main devices to the resonant inductor is about ten inches, which causes about 150 nH stray inductance. Including the stray inductance caused by the laminated bus bar, about 240 nH of stray inductance should be added to the total resonant inductance.

Molypermalloy powder cores (MPP), composed of nickel, iron, and molybdenum, are suitable for this application. They saturate at typically 0.8 T and offer low losses at high frequencies. A MPP core, Magnetics 55894-A2, is selected. Its major parameters: permeability of $\mu$=60, the cross section area Ac=0.654 cm$^2$, the magnetic path length L=6.35 cm, and the inner dimension ID=0.555 inch. Several MPP 55894-A2 cores need to be stacked in order to achieve the desired inductance with one turn of conductor going through. The inductance caused by one 55894-A2 core with turn number N=1, $\Delta L_x$ is obtained as $$\Delta L_x = \frac{0.4 \cdot \pi \cdot A_c \cdot \mu_r}{L} \cdot 10^{-8} = 80 \text{ nH}$$

When seven 55894-A2 cores are stacked, they can generate a total inductance of 560 nH. Adding the 240 nH of stray inductance, the total resonant inductance is about 800 nH, which satisfies the design requirements.

It should be mentioned that the value of stray inductance is just an estimated value at the design stage. After the construction of the inverter power stage is completed, a resonant test is performed to verify the actual inductance. The resonant time period $T_0$ is measured as 4.6 μs. With the resonant capacitance $C_x$, known as 0.625 μF, the actual inductance is obtained as $$L_x = \frac{T_0^2}{(2\pi)^2 \cdot C_x} = 860 \text{ nH}$$

which is closes to the estimated value and satisfies the design requirement.

d) Selection of the Resonant Capacitor

To select a suitable 0.625 μF resonant capacitor, both voltage rating and conduction loss should be considered. The maximum resonant capacitor voltage can be twice the dc bus voltage, which occurs at the no-load condition, or the zero crossing region of the inverter load current. Considering that the battery voltage may be charged up to 400 V in some cases, a capacitor with at least an 800-V rating should be chosen. A polypropylene film capacitor is the ideal choice for minimizing the conduction loss during the high resonant frequency operation. Finally, SBE 716P series 1000-V/0.625-μF polypropylene capacitors with a maximum RMS current rating of 50 A are selected. It has a dissipation factor (DF) of approximately 0.08% at 100 kHz and an ESR of about 1.4 mΩ at 50 kHz.

e) Selection and Packaging of the Auxiliary Switch

The auxiliary device is selected based on the requirements of both RMS and peak values of the resonant current. The auxiliary switches are activated for only a very short time (several microseconds) at the main switch turn-on and turn-off transitions; consequently, the RMS current requirement is relatively low. On the other hand, the auxiliary switches must conduct a narrow, high-peak resonant current. For the 50-kW inverter, the RMS current required for the auxiliary switches is about 60 A, but the maximum resonant peak current can be as much as 400 A. Therefore, the device selection is mainly determined by the peak current handling capability.

The relatively high ratio between the peak and RMS values of the resonant current and the feature of zero-current switching make the thyristor-based devices the ideal auxiliary devices. But the commercial MOS control thyristors (MCTs) are not yet mature for high-power applications. The power MOSFETs are not suitable either, because the conduction loss inherent in the 600V-class MOSFETs is not acceptable. Thus, the selection of the auxiliary devices focuses on the 600V-class IGBTs.

Data sheets of commercial IGBT devices, however, normally do not specify the maximum peak value of a repetitive narrow pulse current with the time width down to the resonant period (3~6 μs). In addition, as a bi-polar device, when the IGBT collector current $I_c$ exceeds the maximum allowable peak current, the on-state collector-emitter Voltage tends to increase dramatically and uncontrollably, which will prevent $I_c$ from increasing any further. If this effect occurs in a resonant circuit, the resonance will become highly nonlinear and the resonant current will be distorted. On the other hand, the auxiliary switches are turned off at the zero-current condition, with a device stress much less than that in a conventional hard-switching turn-off. Therefore, experimental testing of the auxiliary devices is a must, and we have proposed a simple device tester in order to select the eligible auxiliary devices.

Figure 11:
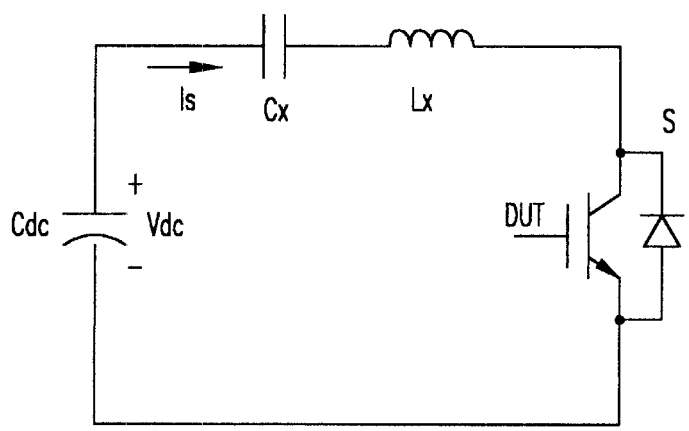
FIG. 11 is a tester that uses a series resonant technique to mimic the zero-current commutation.

The tester uses a series resonant technique to mimic the zero-current commutation. As shown in FIG. 11, initially, the dc capacitor is charged to a certain positive voltage. Then, the switch is turned on. $L_x$ and $C_x$ start to resonate. After half of a resonant period, the resonant current reverses its direction and is carried by its anti-parallel diode. Thus, the switch is turned off at zero-current and its gate signal is removed. If the IGBT can handle the peak current, the current waveform should be sinusoidal. Otherwise, the current waveform will be distorted and the measured resonant time period will become abnormally longer. The purpose of the test is to verify the peak current capability of the device and is therefore a "single-shot" test. Devices can be safely tested up to a very high level of peak current without raising thermal management concerns.

Several IGBT devices have been tested. Finally, the IRG4ZC7 100-A/600-V surface count IGBT with anti parallel diode is selected. it has ⅓ the DC current rating of the main switches (300-A-half-bridge IGBTs), and the data sheet specifies that it has a 4-times over-current capability within 1ms at 25° C. Furthermore, the device test we performed shows that this device can handle peak current up to 800 A within time width down to 6 μs. Therefore, this device is suitable for auxiliary devices for EV propulsion applications. In addition, the IR60EPF06 60A/600V fast-recovery diode is selected as the clamping diode in the auxiliary circuit.

The auxiliary devices are directly surface-mounted on a two-inch by two-inch isolated-metal-substrate (IMS) board. The IMS board uses $Al_2O_3$ as the substrat material, which is a low-cost solution for thermal conduction and electrical isolation. Besides, three copper studs are soldered on the IMS board in order to connect the positive dc rail, the negative dc rail, and the resonant tank.

Layout and Hardware Implementation

The 50-kW prototype is assembled in a liquid-cooled inverter chassis for General Motors' (GM) electric cars. The inverter layout is designed with considerations on a number of critical issues, such as the mechanical limitation of the chassis, the parasitic effects, the EMI problems, and the thermal management of the devices and components.

The power stage of the inverter is mounted on only the left side of the chassis, which saves significant space on the right side. Two dc film capacitors and one input filter are located near the main switches, three MG300J2YS50 300-A/600-V half bridge IGBT modules. Each of the auxiliary switch IMS package is mounted adjacent to the corresponding main IGBT module. The resonant tank for each phase, which has one SBE 716P series 1000-V/0.625-μF polypropylene capacitor and one 860-nH inductor (made of seven Magnetics MPP 55894-A2 cores in stack with one turn of conductor going through), is also mounted adjacent to the corresponding main IGBT module.

To reduce parasitic effects, a laminated bus bar is designed to interconnect the dc-bus capacitors, the main devices, and the auxiliary devices into one unit, and to cover the whole power stage. The gate drivers for both main and auxiliary switches are mounted on a steel plate that is supported above the laminated bus bar.

All parts of the inverter, including the control board, fit well into the GM chassis. The cover of the chassis can therefore be closed so that further EMI and vehicle tests can be performed. It should be mentioned that there are no devices or components installed directly underneath the control board, which is supported on the right side of the chassis by several metal posts. It is the control board that occupies an unnecessarily large space in this prototype. It is expected that by optimizing the design of the control board, its size can be reduced, then the entire inverter can be integrated on only the left side of the chassis.

Experimental Results

The 50-kW three-phase ZCT inverter has been tested to the full-power level with a closed-loop induction motor dynamometer, under a group of speed/torque points. The desirable ZCT soft transition are realized using three auxiliary switches at all testing points, together with general motor drive functions. During the test, none of the devices and components showed any sign of failure, abnormality or over-heating. The dc-bus voltage was 325 V, the switching frequency was 10 kHz, and water-cooling was used for the test.

Figure 12:
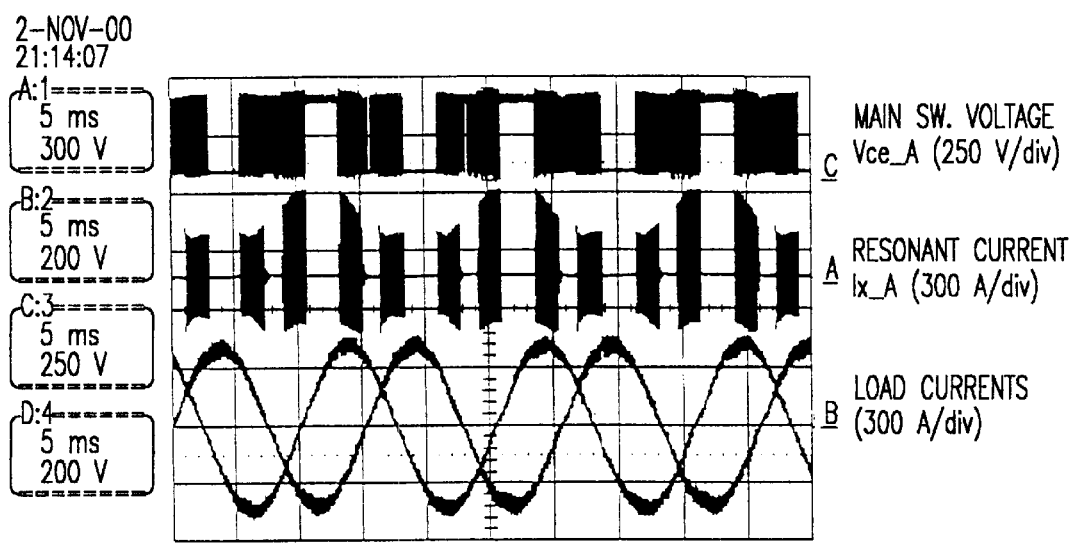
FIG. 12 are ZCT inverter waveforms with the closed loop dynamometer test, delivering power of about 48 kW.

FIG. 12 shows measured waveforms of load currents for phases A and B, and the upper main switch voltage and auxiliary resonant current for phase A, with the closed-loop dynamometer test, delivering an output power of around 48 kW. It can be seen that the two load currents are 120 degrees out of phase, which means that the ZCT inverter does produce a balanced three phase sinusoidal current. Thanks to the ZCT operation, there is almost no obvious overshoot or high-frequency ringing shown in the switch voltage waveform during the entire line cycles.

The soft transition for each phase is executed independently and identically, thus detailed switching cycle waveforms of only one phase need to be presented and analyzed. In order to realize soft transition for two main switches using only one auxiliary switch, two sets of control timings are used based on the directions of the load current $I_{Load}$. Therefore, switching cycle operations for both $I_{Load}>0$ and $I_{Load}<0$ cases will be investigated and characterized.

Figure 13A:
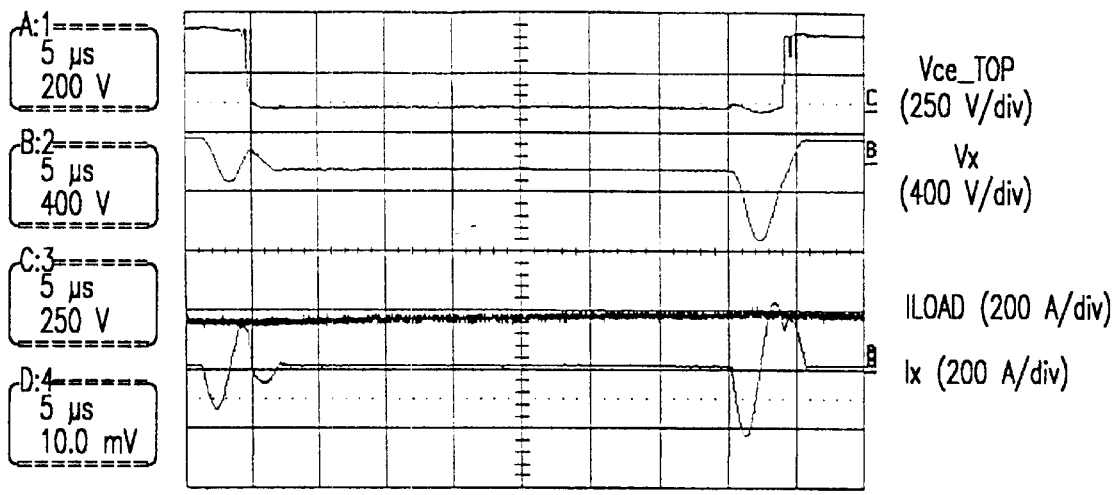
FIGS. 13A–B are switching cycle waveforms with the closed loop dynamometer test under different load current directions for $I_{LOAD}>0$ and $I_{LOAD}<0$, respectively.
Figure 13B:
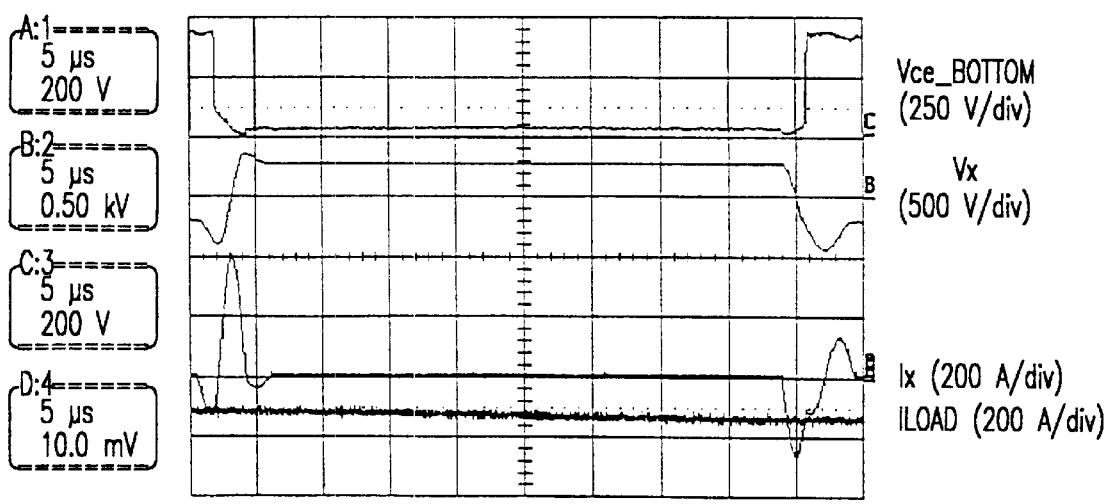

FIGS. 13A–B show measured waveforms of one switching cycle under the $I_{Load}>0$ and $I_{Load}<0$ conditions respectively, including the main switch voltage $V_{ce}$, $I_{Load}$, resonant current $I_x$, and resonant capacitor voltage $V_x$, For the $I_{Load}>0$ case, $I_{Load}$ is conducted through the top IGBT and bottom diode, and the $V_{ce}$, waveform is measured across the top main IGBT module. For the $I_{Load}<0$ case, $I_{Load}$ is conducted through the bottom IGBT and top diode, and the V, waveform is measured across the bottom main IGBT module. Because the laminated bus bar is designed for the power stage, the main switch current can not be measured directly; however, the $I_x$, and $I_{Load}$ waveforms are good indications of the inverter operation. Both $I_{Load}>0$ and $I_{Load}<0$ cases show similar soft-transition features. At the turn-on transition, the amplitude of $I_x$, equals that of $I_{Load}$ before $V_{ce}$, decreases, which indicates that the current in the main diode is diverted to the auxiliary circuit before the opposite main switch is turned on. Hence, the diode reverse-recovery current and turn-on loss are significantly reduced. At the turn-off transition, the amplitude of $I_x$, exceeds that of $I_{Load}$ before $V_{ce}$, rises to the dc-bus voltage, which indicates that the anti-parallel diode across the main switch is actually conducting the surplus current when the gate driver signal is removed. Therefore, the switch is turned off at the zero-current condition without much switching loss. Again, almost no overshoot or high-frequency ringing is observed in the switch voltage waveforms. The waveforms also show the difference between the ZCT operations under different load directions. This difference is associated with the proper timing control by using only one auxiliary switch.

Figure 14:
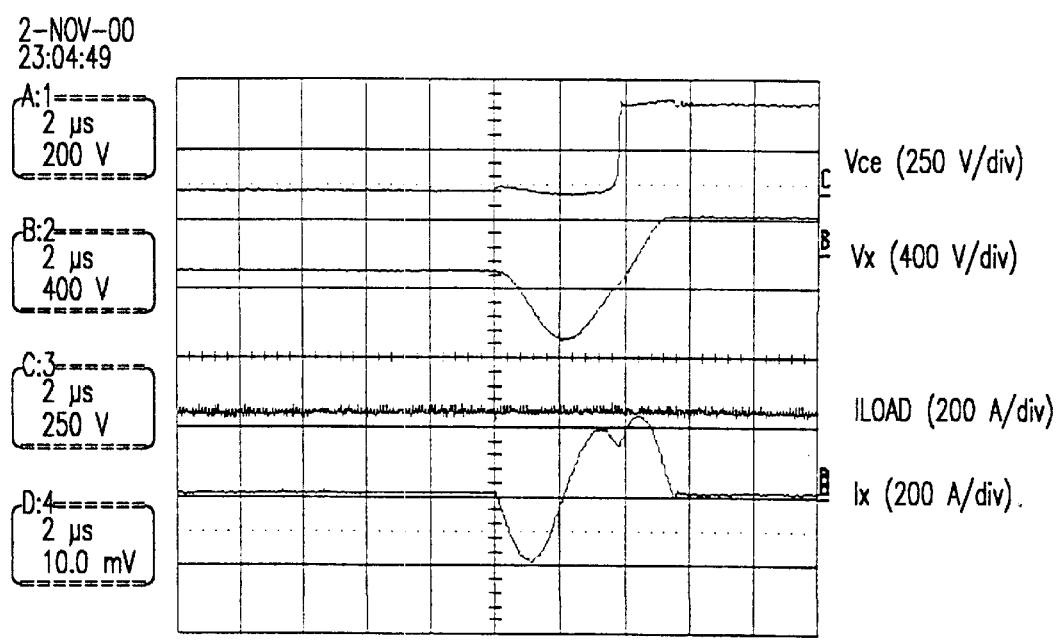
FIG. 14 are turn-off waveforms which demonstrate that the switch is still safely turned off with the reduced switching loss, even if the zero-current turn-off condition is lost.
Figure 15A:
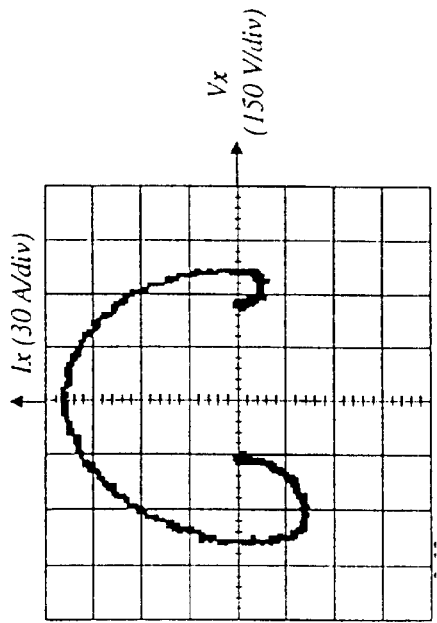
FIGS. 15A–D are measured state-plane trajectories of the proposed ZCT inverter, showing turn-on and turn-off transitions, respectively, for the case when $I_{LOAD}>0$ (FIGS. 15A and B) and for $I_{LOAD}<0$ (FIGS. 15C and D)
Figure 15B:
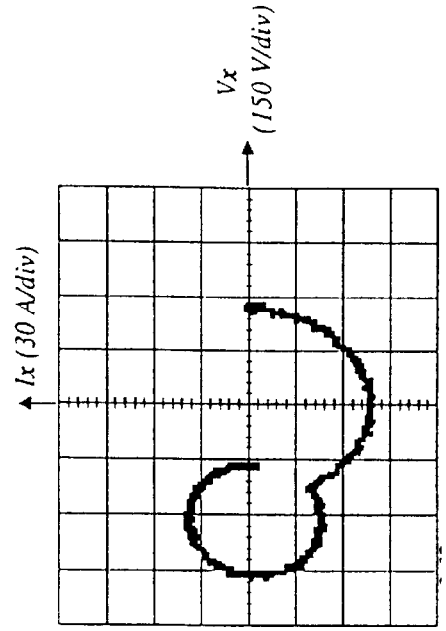
Figure 15C:
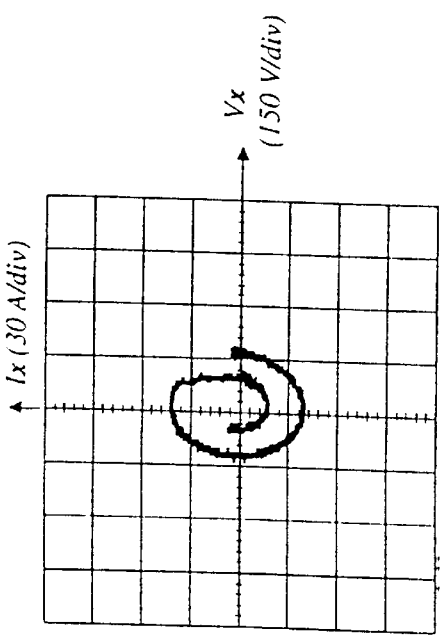
Figure 15D:
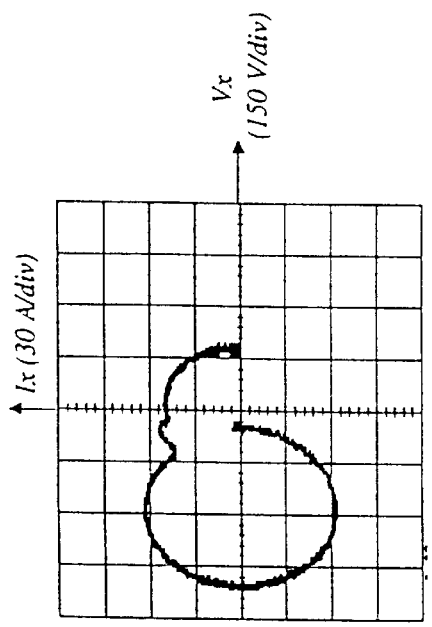

As discussed earlier, even if the zero-current turn-off condition is lost, the switch can still be safely turned off. FIG. 14 show measured turn-off waveform at a high load current condition, which demonstrates this feature. In this case, the $I_{Load}$ is measured around 240 A, but the peak of the resonant current $i_x$, is only around 200 A. Clearly the switch can not be turned off at zero current. However, the remaining switch current when the gate signal is removed is the difference between $I_{Load}$ and $i_x$.

Figure 16A:
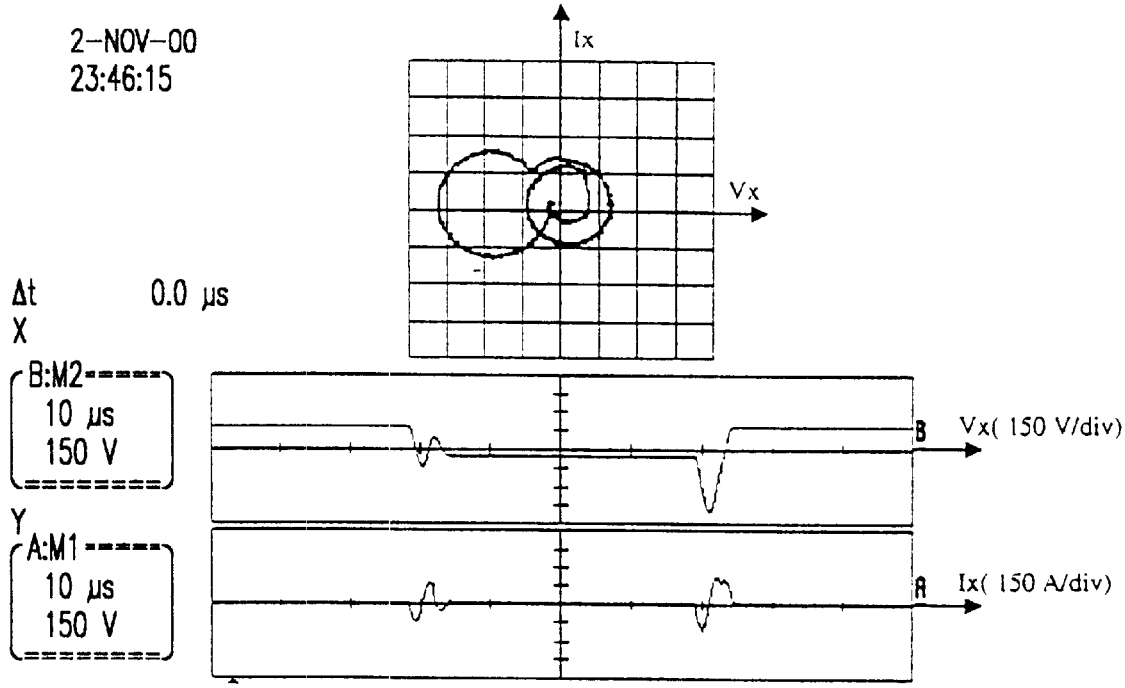
FIGS. 16A–B are state-plane trajectories of switching cycle operations with the closed loop dynamometer test under different load current directions for $I_{LOAD}>0$ and $I_{LOAD}<0$, respectively.
Figure 16B:
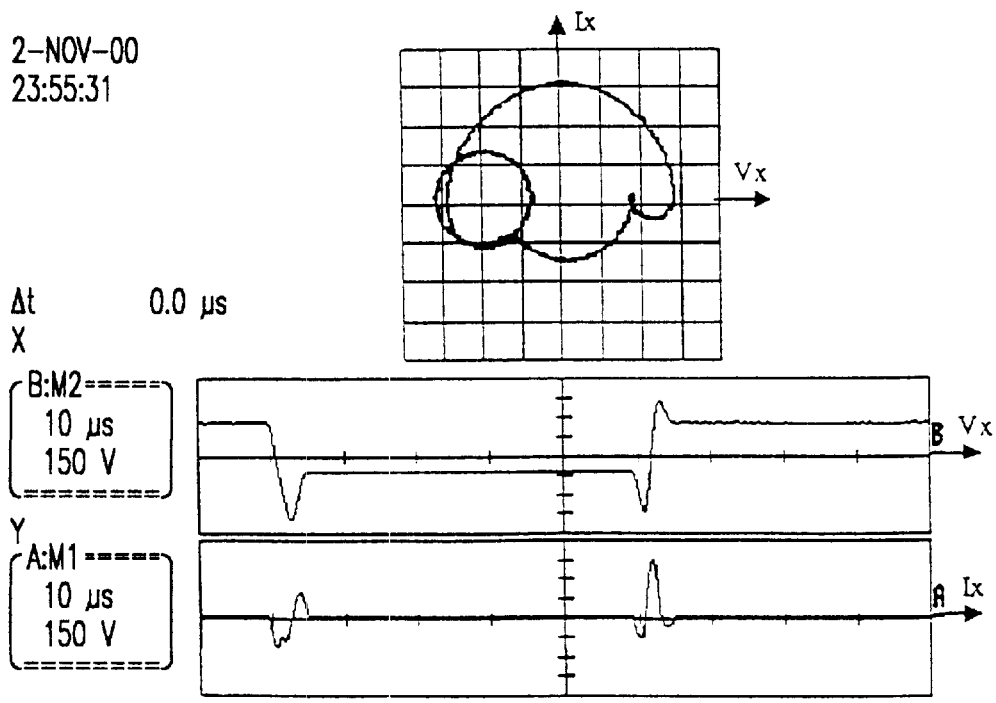
Figure 17A:
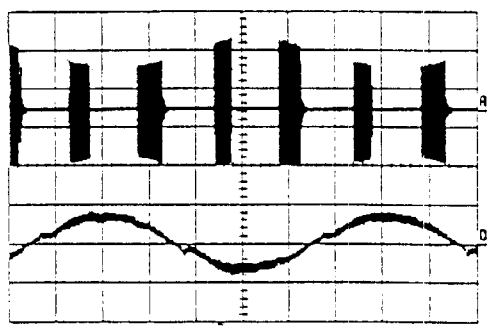
FIGS. 17A–D are measured current waveforms of the ZCT inverter at different speed/torque (S/T) points during the dynamometer test.
Figure 17B:
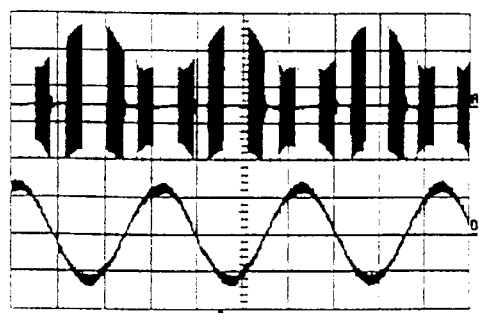
Figure 17C:
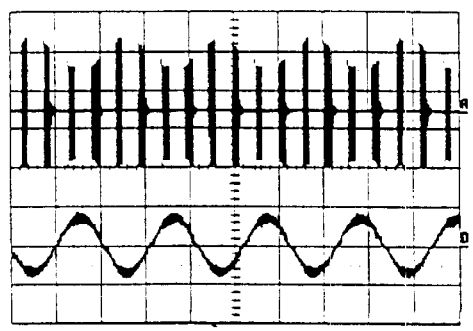
Figure 17D:
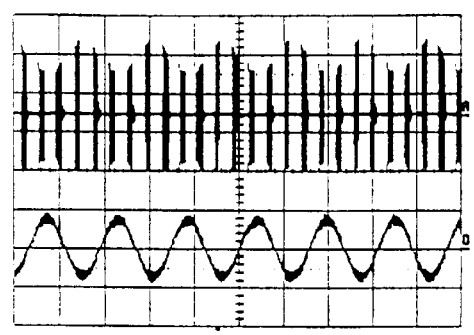

For further characterization, by measuring the resonant inductor current $i_x$, and capacitor voltage $v_x$, simultaneously at the X-Y display mode of the oscilloscope, the state-plane trajectory is obtained. FIGS. 15A–D show the measured state-plane trajectories for the turn-on and turn-off transitions, for both $I_{Load}>0$ and $I_{Load}<0$ cases. By performing the measurement over one switching cycle, the state-plane trajectories for one complete soft transition are obtained and shown in FIGS. 16A–B. They are visual indicators of the inverter operation.

Figure 18:
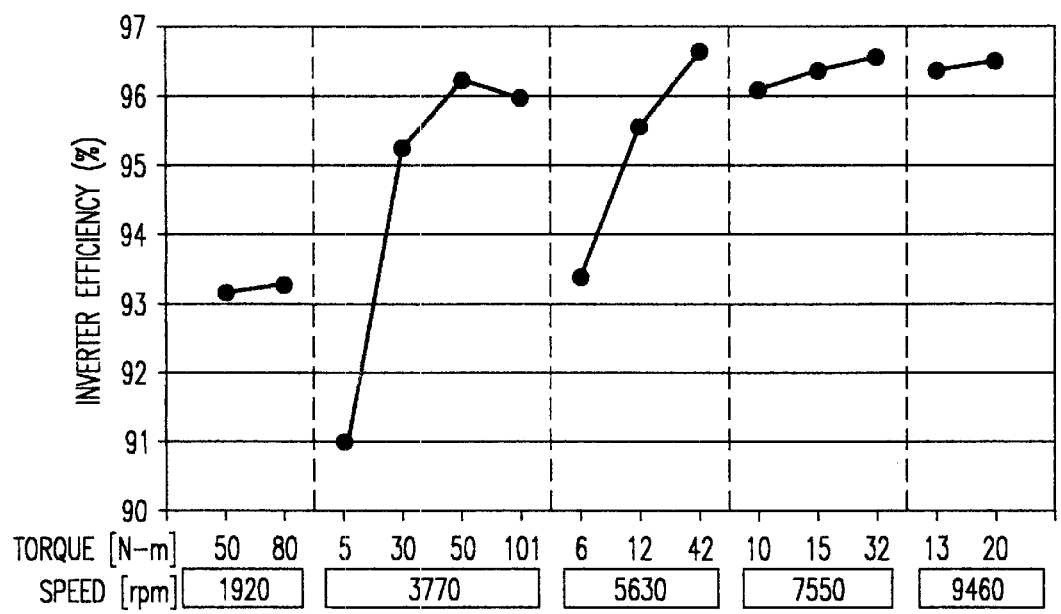
FIG. 18 is a graph showing the measured efficiency of the 50 kW ZCT inverter tested under a group of speed/torque points.

The speed and torque points for testing the 50-kW ZCT inverter cover 1920~9470 rpm and 5~101 N-m, respectively. They represent a quite wide range of motor drives. FIGS. 17A–D shows the measured load current and resonant current waveforms at different testing points. The load current waveforms are quite close to sinusoidal at most points, which demonstrates that the ZCT implementation does not interfere with the fundamental control functions of the closed-loop induction motor drive system. Otherwise, the load current waveforms would be distorted, and the overall system would become unstable at certain points. During the test, the inverter DC input power and AC output power are read from the Voltech PM3000 power analyzer. The motor output power is calculated from the product of the speed and torque. The maximum power reaches about 48 kW at the DC input, 46.5 kW at the inverter output, and 40 kW at the motor shaft, which occurs at 3770 rpm/5 N-m. The minimum power is about 3 kW at the DC input, 2.7 kW at the inverter output, and 40 kW at the motor shaft, which occurs at 3770 rpm/101 N-m. FIG. 18 is a curve that illustrates the measured inverter efficiency as a function of the speed/torque points. The range of the measured inverter efficiency is around 91–96.6%. When the speed is low, the efficiency normally tends to be lower. With low torque, the efficiency is also lower. When the torque increases, the efficiency normally improves. The basic trend corresponds with conventional motor drive system.

While the invention has been described in terms of a single preferred embodiment, those skilled in the art will recognize that the invention can be practiced with modification within the spirit and scope of the appended claims.

We claim:

1. A circuit for three-phase electric conversion, comprising:
   a main switching circuit comprising a plurality of main switches connected between a power rail and a ground rail;
   an auxiliary switching circuit comprising a plurality of auxiliary switches connected between said plurality of main switches and one of said power rail and said ground rail, said plurality of auxiliary switches being half in number of said plurality of main switches.

2. A circuit for three-phase electric conversion as recited in claim 1 wherein each of said auxiliary switches is connected to a pair of said main switches through a resonant tank circuit.

3. A circuit for three-phase electric conversion as recited in claim 1,
wherein said plurality of main switches comprises six main switches, and
wherein said plurality of auxiliary switches comprises three auxiliary switches.

4. A circuit for three-phase electric conversion as recited in claim 1, wherein said plurality of main switches comprises six main switches arranged in three pairs, and
wherein said plurality of auxiliary switches comprises three auxiliary switches.

5. A circuit for three-phase electric conversion as recited in claim 4 further comprising:
a resonant tank comprising a series connected inductor and capacitor connected between each of said auxiliary switches and to each said pair of main switches.

6. An electric conversion circuit, comprising:
a three phase alternating current terminal;
a direct current terminal connected between a positive rail and a negative rail;
a main switching circuit comprising:
  a plurality of main switches connected between said positive rail and said negative rail, a center point between each main switch pair comprising said three phase alternating current terminal; and
  parallel diodes connected across each of said main switches;
an auxiliary switching circuit comprising:
  a plurality of pairs of auxiliary diodes connected between said positive rail and said negative rail; and
  a plurality of auxiliary switches being half in number of said plurality of main switches, each connected at a first end to one of said positive rail and said negative rail and at a second end to a center point of a respective one of said pairs of auxiliary diodes; and
a resonant tank circuit connecting said main switching circuit and said auxiliary switching circuit.

7. An electric conversion circuit as recited in claim 6 wherein said conversion circuit is a rectifier when a DC load is connected to said direct current terminal and an AC source is connected to said a three phase alternating current terminal.

8. An electric conversion circuit as recited in claim 6 wherein said conversion circuit is an inverter when a DC source is connected to said direct current terminal and a load is connected to said a three phase alternating current terminal.

9. An electric conversion circuit as recited in claim 6 wherein
said plurality of main switches comprises six main switches arranged in three pairs of main switches,
said plurality of pairs of auxiliary diodes comprises three pairs of auxiliary diodes,
plurality of auxiliary switches comprises three auxiliary switches.

10. An electric conversion circuit as recited in claim 9 wherein said resonant tank circuit comprises three pairs of an inductor and a capacitor connected in series.

* * * * *